(12) United States Patent
Eshraghi et al.

(10) Patent No.: US 7,695,843 B2
(45) Date of Patent: *Apr. 13, 2010

(54) MICROFIBROUS FUEL CELL ASSEMBLIES COMPRISING FIBER-SUPPORTED ELECTROCATALYST LAYERS, AND METHODS OF MAKING SAME

(75) Inventors: Ray R. Eshraghi, Cary, NC (US);
Changquig Lin, Raleigh, NC (US);
Jung-Chou Lin, Raleigh, NC (US);
Martin E. Ketterer, Apex, NC (US)

(73) Assignee: Microcell Corporation, Raleigh, NC (US)

( * ) Notice: Subject to any disclaimer, the term of this patent is extended or adjusted under 35 U.S.C. 154(b) by 1304 days.

This patent is subject to a terminal disclaimer.

(21) Appl. No.: 11/030,703

(22) Filed: Jan. 6, 2005

(65) Prior Publication Data
US 2005/0181269 A1 Aug. 18, 2005

Related U.S. Application Data

(60) Provisional application No. 60/544,729, filed on Feb. 13, 2004.

(51) Int. Cl.
*H01M 2/00* (2006.01)
*H01M 4/00* (2006.01)
*B05D 5/12* (2006.01)
*B01J 49/00* (2006.01)

(52) U.S. Cl. .......................... 429/34; 429/31; 429/40; 429/44; 427/115; 521/28; 502/101

(58) Field of Classification Search .................. 429/30, 429/34, 40, 41, 42, 43, 44, 38, 31–33; 427/115; 521/27, 28; 502/101, 527.14
See application file for complete search history.

(56) References Cited

U.S. PATENT DOCUMENTS

| 4,659,637 A | 4/1987 | Nelson et al. |
| 5,492,782 A | 2/1996 | Higley |
| 5,916,514 A | 6/1999 | Eshraghi |
| 5,928,808 A | 7/1999 | Eshraghi |
| 5,989,300 A | 11/1999 | Eshraghi |

(Continued)

FOREIGN PATENT DOCUMENTS

| JP | 08-138700 A1 | 5/1996 |
| JP | 9223507 A | 8/1997 |

OTHER PUBLICATIONS

Co-pending U.S. Appl. No. 12/349,483, filed Jan. 6, 2009.

*Primary Examiner*—Raymond Alejandro
(74) *Attorney, Agent, or Firm*—Steven J. Hultquist; Intellectual Property/Technology Law

(57) ABSTRACT

A microfibrous fuel cell structure of elongated form with a longitudinal axis. Such microfibrous fuel cell includes electrocatalyst layers supported by a fiber network formed of unidirectional or substantially unidirectional conductive fibers. The conductive fibers of such fiber network are oriented parallelly or substantially parallelly to the longitudinal axis of the fuel cell, therefore allowing such fiber network to conform to the curvature of the microfibrous fuel cell along the radial direction but without causing overbending of the individual fibers.

47 Claims, 11 Drawing Sheets

U.S. PATENT DOCUMENTS

| | | |
|---|---|---|
| 6,004,691 A | 12/1999 | Eshraghi |
| 6,042,958 A * | 3/2000 | Denton et al. ............... 429/30 |
| 6,338,913 B1 * | 1/2002 | Eshraghi ............... 429/41 |
| 6,399,232 B1 | 6/2002 | Eshraghi |
| 6,403,248 B1 | 6/2002 | Eshraghi |
| 6,403,517 B1 | 6/2002 | Eshraghi |
| 6,444,339 B1 | 9/2002 | Eshraghi |
| 6,495,281 B1 | 12/2002 | Eshraghi |
| 7,422,813 B2 * | 9/2008 | Eshraghi et al. ............... 429/30 |
| 2004/0005498 A1 | 1/2004 | Eshraghi |
| 2004/0058224 A1 | 3/2004 | Eshraghi et al. |
| 2004/0142101 A1 | 7/2004 | Eshraghi et al. |
| 2004/0175605 A1 | 9/2004 | Eshraghi et al. |
| 2004/0191588 A1 | 9/2004 | Eshraghi et al. |
| 2004/0197557 A1 | 10/2004 | Eshraghi et al. |
| 2004/0219421 A1 | 11/2004 | Eshraghi |
| 2006/0118994 A1 | 6/2006 | Eshraghi et al. |
| 2007/0243439 A1 | 10/2007 | Eshraghi et al. |
| 2009/0130511 A1 | 5/2009 | Eshraghi et al. |
| 2009/0130512 A1 | 5/2009 | Eshraghi et al. |

* cited by examiner

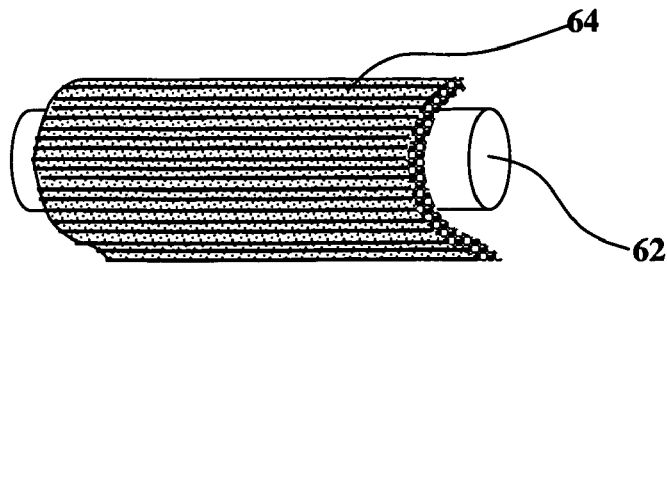
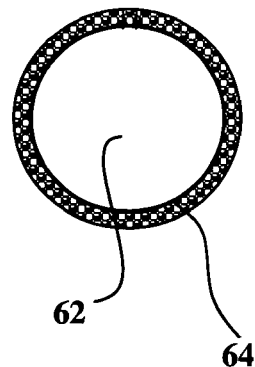
FIGURE 6A  FIGURE 6B
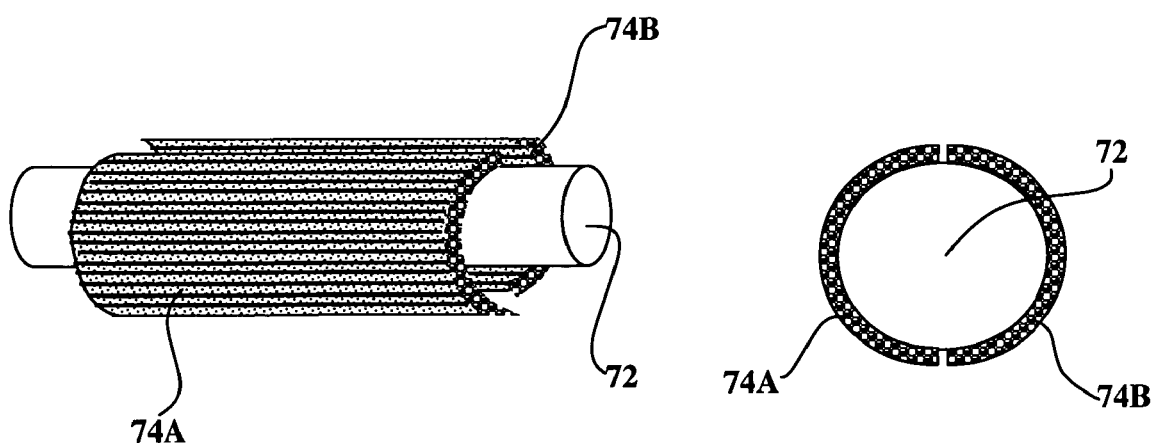
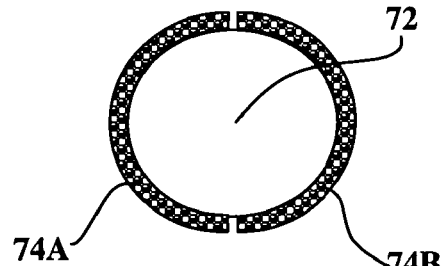
FIGURE 7A  FIGURE 7B

MICROFIBROUS FUEL CELL ASSEMBLIES COMPRISING FIBER-SUPPORTED ELECTROCATALYST LAYERS, AND METHODS OF MAKING SAME

CROSS-REFERENCE TO RELATED APPLICATIONS

This claims priority to U.S. Provisional Patent Application No. 60/544,729, filed Feb. 13, 2004 in the names of Ray R. Eshraghi, Changquig Lin, Jung-Chou Lin, and Martin E. Ketterer for "MICROFIBROUS FUEL CELL ASSEMBLIES COMPRISING FIBER-SUPPORTED ELECTROCATALYST LAYERS, AND METHODS OF MAKING SAME."

GOVERNMENT INTEREST

The U.S. government may own rights in the present invention, pursuant to Grant No. 70NANB1H3039 awarded by the Advanced Technology Program (ATP) of National Institute of Science and Technology (NIST).

BACKGROUND OF THE INVENTION

1. Field of the Invention

The present invention relates to fuel cell assemblies comprising one or more microfibrous fuel cell elements containing fiber-supported electrocatalyst layers, and methods of making same.

2. Description of the Related Art

The recently developed microfibrous electrochemical cells, as disclosed by Ray R. Eshraghi in U.S. Pat. Nos. 5,916,514; 5,928,808; 5,989,300; 6,004,691; 6,338,913; 6,399,232; 6,403,248; 6,403,517; 6,444,339; and 6,495,281, are advantageously characterized by reduced sizes (outer diameters usually within the range of from about 10 microns to about 10 millimeters) and increased active surface areas, which have demonstrated increased volumetric power density (i.e., unit volume power output) in comparison with conventional flat sheet or flat panel electrochemical cells. Further, such microfibrous electrochemical cells can be easily packed and assembled together. Therefore, by assembling multiple serially-connected and/or parallelly-connected microfibrous cells into a compact multi-cell unit, one can effectively modulate the voltage and/or current output of such multi-cell unit according to specific system requirements. The microfibrous electrochemical cells disclosed by the above-listed U.S. patents thus represent an important advancement in the field of power generation.

Among various microfibrous electrochemical cells, microfibrous fuel cells offer especially attractive features as energy conversion devices, including high energy efficiency and low level gaseous/solid emission, in comparison with traditional combustion-based energy sources. There are therefore particular interests in developing high quality power sources for use in hand-held or mobile electrical devices, electrically powered vehicles, as well as in distributed power generation applications, based on such microfibrous fuel cells.

A generalized microfibrous fuel cell, as described in the above-listed Eshraghi patents, comprises an inner current collector, an inner electrocatalyst layer, a microfibrous hollow membrane separator, an outer electrocatalyst layer, and an outer current collector. Additional components, such as humidifying tubes, heat-exchanging tubes and additional membrane layers, can be further configured and incorporated into the microfibrous fuel cell to improve the cell performance.

The inner and outer electrocatalyst layers of such microfibrous fuel cells are formed of electrocatalyst particles, which are coated onto or impregnated into the inner and outer surfaces of the hollow fibrous membrane separator. Although the catalyst/membrane bond is strong, the membrane-electrode assembly (MEA) may expand and contract during cyclic operation of the fuel cell. This is due to the fact that the ion-exchange polymer membranes used in fuel cells swell or shrink depending on the state of the membrane hydration. The expansion and contraction of the membrane may have a deleterious effect on the MEA structure and long-term performance of the fuel cell.

It is therefore an object of the present invention to provide an improved microfibrous fuel cell element, which comprises electrocatalytical structures characterized by high mechanical strength and robustness that provide good adhesion to the membrane separator even in consideration of the dimensional changes of such membrane separator during operation.

It is another object of the present invention to provide improved microfibrous fuel cells that can be manufactured by continuous extrusion on an automated production line, which enables commercial production of such microfibrous fuel cells, enhancing cell uniformity and consistency, and reducing the associated manufacturing costs.

It is a further object of the present invention to provide a fuel cell assembly comprising multiple improved microfibrous fuel cells connected in series and/or parallel for reliable and consistent power generation.

Other objects of the present invention will be more fully apparent from the ensuing disclosure and appended claims.

SUMMARY OF THE INVENTION

The present invention in one aspect relates to a microfibrous fuel cell element comprising:

(a) a microfibrous hollow membrane separator defining a bore side and a shell side;

(b) an inner current collector at the bore side thereof;

(c) an inner electrocatalyst layer in contact with an inner surface of the membrane separator;

(d) an outer current collector at the shell side thereof; and (e) an outer electrocatalyst layer in contact with an outer surface of the membrane separator, wherein said microfibrous fuel cell element has a longitudinal axis, wherein at least one of the inner and outer electrocatalyst layers comprises a fiber network impregnated with electrocatalyst material, wherein such fiber network comprises multiple continuous conductive fibers extending in directions that are substantially parallel to the longitudinal axis of such microfibrous fuel cell element, and wherein an inner fluid passage is provided between the inner electrocatalyst layer and the inner current collector for flow of either a fuel-containing or an oxidant-containing fluid.

The term "microfibrous" as used herein refers to a fibrous structure having a cross-sectional outer diameter in a range of from about 10 microns to about 10 millimeters, preferably from about 10 microns to about 5 millimeters, and more preferably from about 10 microns to about 1 millimeter.

The term "continuous" as used herein refers to extension of the supporting fibers as being coextensive or substantially coextensive with the microfibrous hollow membrane separator in its longitudinal direction.

The electrocatalyst structure (i.e., the inner and/or outer electrocatalyst layer) of the present invention is preferably substantially free of fibers that are orthogonally oriented in relation to the longitudinal axis of the microfibrous fuel cell element, and more preferably, it is substantially free of fibers that are not parallelly oriented in relation to the longitudinal axis of such fuel cell. Instead, essentially all the fibers incorporated in the supporting fiber network of such electrocatalyst structure are unidirectional, i.e., they are parallelly oriented or substantially parallel in relation to the longitudinal axis of the microfibrous fuel cell, which facilitates conformation of such fiber network to the microfibrous contour of the fuel cell structure and minimizes damage to individual fibers caused by overbending or overstressing.

Therefore, the present invention provides an improved electrocatalyst structure, i.e., a fiber-reinforced electrocatalyst structure, which is particularly suitable for incorporation in a microfibrous fuel cell structure characterized by a high curved contour of small cross-sectional diameter (e.g., from about 10 microns to about 10 millimeters, preferably from about 10 microns to about 5 millimeters, and more preferably from about 10 microns to about 1 millimeter).

The conductive fibers used in the present invention may comprise any suitable conductive material of sufficient mechanical strength for affixing and supporting the electrocatalytic material and sufficient corrosion-resistance for withstanding the harsh chemical environment imposed by the electrochemical reactions. For example, such conductive fibers can be carbon fibers, conductive polymeric fibers, corrosion-resistant metal fibers, or any composite fibers of suitable electrical conductivity, mechanical strength, and corrosion-resistance.

Preferably, such conductive fibers comprise carbon fibers having a cross-sectional diameter in a range of from about 0.1 micron to about 100 microns, more preferably from about 0.1 micron to about 20 microns, and most preferably from about 5 microns to about 10 microns. More preferably, such conductive fibers are characterized by the following properties:

TABLE 1

| Tensile Modulus (msi) | ~10-140 |
| Tensile Strength (ksi) | ~200-900 |
| Electrical Resistivity ($\mu\Omega$m) | ~2-30 |
| Thermal Conductivity (W/m · K) | ~5-700 |
| Filament Diameter ($\mu$) | ~5-20 |
| Carbon Assay (%) | ~90-100 |

Preferably, such carbon fibers are fabricated by carbonization of various precursor fibers that comprises polyacrylonitrile (PAN), pitch, rayon, cellulose, phenolic resin, epoxy resin, phthalonitrile resin, aromatic acetylene-derived polymers, etc. The PAN and pitch-based carbon fibers supplied by Cytec Engineering Materials at Anaheim, Calif. and the pitch-based carbon fibers manufactured by Nippon Graphite Fiber Corporation at Cypress, Calif. are examples of carbon fibers suitable for practice of the present invention.

Another aspect of the present invention relates to a method for forming a microfibrous fuel cell element as described hereinabove, comprising the steps of:

(a) providing a catalytic precursor structure comprising a fiber network impregnated with electrocatalyst material, wherein such fiber network comprises multiple continuous conductive fibers extending in directions that are substantially parallel to one another; and (b) incorporating such catalytic precursor structure into at least one of the inner or outer electrocatalyst layers of a microfibrous fuel cell element, wherein the multiple continuous conductive fibers thereof are parallelly oriented in relation to longitudinal axis of the microfibrous fuel cell element.

Specifically, such catalytic precursor structure may be formed by:

(i) forming a fiber network comprising multiple continuous conductive fibers extending in directions that are substantially parallel to one another; and (ii) impregnating such fiber network with an electrocatalyst material, or alternatively, by:

(i) catalyzing continuous conductive fibers with an electrocatalyst material; and (ii) forming a fiber network comprising multiple catalyzed continuous conductive fibers arranged in directions that are substantially parallel to one another.

A still further aspect of the present invention relates to a method for forming a microfibrous fuel cell element as described hereinabove, comprising the steps of:

(a) providing multiple continuous conductive fibers;

(b) providing a catalyst composition comprising an electrocatalyst material; and (c) incorporating such continuous conductive fibers and such catalyst composition into at least one of the inner or outer electrocatalyst layers of a microfibrous fuel cell element to form a fiber network that is impregnated with the electrocatalyst material and comprises multiple continuous conductive fibers extending in directions that are substantially parallel to the longitudinal axis of such microfibrous fuel cell element.

Before incorporation into the electrocatalyst layer(s), such multiple continuous conductive fibers can be preliminary processed to form a fiber network containing multiple continuous conductive fibers that are substantially parallel to one another. Such fiber network is preferably formed by using a binder material, which provides cohesion between the unidirectional or substantially unidirectional conductive fibers. Optionally, a removable carrier material is mixed with the binder for forming the fiber network, while such carrier material can be selectively removed at a later time to preserve the interstices between the conductive fibers and allow permeation of fuel or oxygen therethrough.

Alternatively, such continuous conductive fibers can be directly incorporated into the electrocatalyst layer(s) without such preliminary process, while the catalyst composition contains binder material in addition to the electrocatalyst material and functions to bind the multiple conductive fibers together, thereby directly forming a fiber network impregnated with the electrocatalyst material.

Electrocatalyst impregnation of the fiber network or catalyzation of the conductive fibers can be carried out by any suitable methods, which include, but are not limited to, ink coating, sputtering, electrodeposition, chemical vapor deposition, etc.

A still further aspect of the present invention relates to a microfibrous fuel cell assembly, comprising multiple above-described microfibrous fuel cell elements in serial and/or parallel connection.

Preferably, such microfibrous fuel cell assembly is placed in a housing that provides a first fluid passage for flowing a fuel-containing fluid through either the bore or the shell sides of the microfibrous fuel cell elements and a second fluid passage for flowing an oxygen-containing fluid through opposite sides of the microfibrous fuel cell elements, while the first and the second fluid passage are separate and sealed against each other in a leak-tight manner.

Yet another aspect of the present invention relates to a catalyst structure comprising a fiber network impregnated with an electrocatalyst material, wherein the fiber network comprises multiple conductive fibers that are substantially parallel to one another.

Still another aspect of the present invention relates to a binding composition comprising:

(i) a binding material,
(ii) optionally, an electrically conductive material, and
(iii) a removable carrier material.

Yet another aspect of the present invention relates to a method for forming a microfibrous fuel cell structure in a continuous manner. Such method comprises the steps of:

(a) providing a microfibrous inner current collector;

(b) passing said microfibrous inner current collector through a first extrusion die for applying a layer of a first adhesion material thereover;

(c) attaching to the microfibrous inner current collector one or more catalyst structures to form a first microfibrous structure that comprises the inner current collector and an inner electrocatalyst layer, wherein each of such catalyst structures comprises a fiber network impregnated with an electrocatalyst material, and wherein such fiber network comprises multiple conductive fibers that are substantially parallel to one another;

(d) passing the first microfibrous structure through a second extrusion die for applying a membrane-forming material layer over the inner electrocatalyst layer;

(e) heating and/or drying the membrane-forming material layer to form a second microfibrous structure that comprises the inner current collector, the inner electrocatalyst layer, and a solidified membrane separator;

(f) passing such second microfibrous structure through a third extrusion die for applying a layer of a second adhesion material thereover;

(g) attaching to the second microfibrous structure one or more catalyst structures to form a third microfibrous structure that comprises the inner current collector, the inner electrocatalyst layer, the membrane separator layer, and an outer electrocatalyst layer, wherein each of the catalyst structures comprises a fiber network impregnated with an electrocatalyst material, and wherein such fiber network comprises multiple conductive fibers that are substantially parallel to one another;

(h) treating the third microfibrous structure, so as to provide a fluid passage between the inner current collector and the inner electrocatalyst layer; and (i) attaching an outer current collector to an outer surface of such third microfibrous structure to form a microfibrous fuel cell element, wherein the microfibrous fuel cell element has a longitudinal axis, wherein the conductive fibers of the catalyst structures in (c) and/or (g) are arranged along directions that are substantially parallel to the longitudinal axis of such microfibrous fuel cell element.

As mentioned hereinabove, the inner and/or outer electrocatalyst layers may be formed by coating onto a fibrous substrate (such as an inner current collector or a membrane separator) one or more catalytic structure that comprises a fiber network impregnated with electrocatalyst material.

Alternatively, the inner and/or outer electrocatalyst layers may be formed by concurrently coating onto such fibrous substrate multiple continuous conductive fibers or one or more uncatalyzed fiber networks with a catalyst composition that comprises the electrocatalyst material and optionally a binder material. The conductive fibers or the fiber network is therefore catalyzed in situ during formation of the electrocatalyst layer.

Therefore, a further aspect of the present invention relates to a method for forming a microfibrous fuel cell structure in a continuous manner, comprising the steps of:

(a) providing a microfibrous inner current collector;

(b) passing such microfibrous inner current collector through a first extrusion die for applying a layer of a catalyst composition thereover, wherein the catalyst composition comprises an electrocatalyst material and optionally a binder material;

(c) attaching multiple continuous conductive fibers or one or more fiber networks that comprise multiple continuous conductive fibers to the microfibrous inner current collector, thereby forming a first microfibrous structure comprising the inner current collector and an inner electrocatalyst layer, wherein the inner electrocatalyst layer comprises a fiber network that is impregnated with the electrocatalyst material and comprises multiple conductive fibers that are substantially parallel to one another;

(d) passing the first microfibrous structure through a second extrusion die for applying a membrane-forming material layer over the inner electrocatalyst layer;

(e) heating and/or drying such membrane-forming material layer to form a second microfibrous structure that comprises the inner current collector, the inner electrocatalyst layer, and a solidified membrane separator;

(f) passing the second microfibrous structure through a third extrusion die for applying a layer of a catalyst composition thereover, wherein the catalyst composition comprises an electrocatalyst material and optionally a binder material;

(g) attaching multiple continuous conductive fibers, or one or more fiber networks comprising multiple continuous conductive fibers, to the second microfibrous structure, thereby forming a third microfibrous structure comprising the inner current collector, the inner electrocatalyst layer, the membrane separator, and an outer electrocatalyst layer, wherein the outer electrocatalyst layer comprises a fiber network that is impregnated with the electrocatalyst material and comprises multiple conductive fibers that are substantially parallel to one another;

(h) treating the third microfibrous structure, so as to provide a fluid passage between the inner current collector and the inner electrocatalyst layer; and (i) attaching an outer current collector to an outer surface of such third microfibrous structure to form a microfibrous fuel cell element, wherein the microfibrous fuel cell element has a longitudinal axis, wherein the conductive fibers of the fiber networks in (c) and/or (g) are arranged along directions that are substantially parallel to the longitudinal axis of such microfibrous fuel cell element.

A still further aspect of the present invention relates to a system for forming a microfibrous fuel cell structure in a continuous manner, as described hereinabove.

Other aspects, features and advantages of the invention will be more fully apparent from the ensuing disclosure and appended claims.

BRIEF DESCRIPTION OF THE DRAWINGS

FIG. 6A illustrates formation of an electrocatalyst layer on a microfibrous substrate using one catalyzed carbon ribbon, according to one embodiment of the present invention.

FIG. 6B shows the cross-sectional view of the electrocatalyst layer and the microfibrous substrate of FIG. 6A.

FIG. 7A illustrates formation of an electrocatalyst layer on a microfibrous substrate using two catalyzed carbon ribbon, according to one embodiment of the present invention.

FIG. 7B shows the cross-sectional view of the electrocatalyst layer and the microfibrous substrate of FIG. 7A.

DETAILED DESCRIPTION OF THE INVENTION, AND PREFERRED EMBODIMENTS THEREOF

Figure 1:
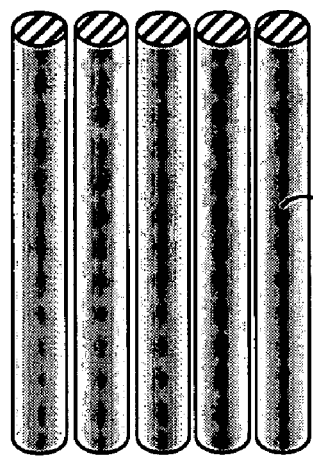
FIG. 1 shows a perspective view of multiple parallel carbon fibers, according to one embodiment of the present invention.

Microfibrous electrochemical cells and methods of making same have been described by U.S. Pat. Nos. 5,916,514; 5,928,808; 5,989,300; 6,004,691; 6,338,913; 6,399,232; 6,403,248; 6,403,517; 6,444,339; and 6,495,281, as well as by U.S. patent application Ser. No. 10/744,203 filed on Dec. 23, 2003 for "SUBSTRATE-SUPPORTED PROCESS FOR MANUFACTURING MICROFIBROUS FUEL CELLS," and issued on Apr. 8, 2009 as U.S. Pat. No. 7,354,545, the contents of which are incorporated herein by reference, in their respective entireties and for all purposes.

A very unique and advantageous aspect of the present invention relates to the use of substantially unidirectional fiber elements for affixing and supporting the electrocatalyst material in a microfibrous fuel cell structure.

Composite catalytic structures containing fabrics of carbon fibers have been known in the conventional planar fuel cell structures. Such catalyzed carbon fabrics contain either woven or non-woven carbon fibers arranged in multiple or random directions and are suitable for use in planar or substantially planar fuel cell structures.

However, such conventional composite catalytic structures are not suitable for use in the microfibrous fuel cells that have small radii and high curvature in the radial direction. Carbon fibers with adequate electrical conductivity usually have high tensile modulus (typically >30 msi), which makes them susceptible to breakage if the monofilaments are wound around a small radius. Further, multidirectional or randomly oriented carbon fibers, once catalyst impregnated, become stiff and do not conform well to curved surfaces. Therefore, the conventional carbon-fiber-reinforced catalytic structures are not compatible with microfibrous fuel cells.

The present invention overcomes such deficiency of the conventional carbon-fiber-reinforced catalytic structures, by providing a new fiber-reinforced catalytic structure that is particularly conformable to the small radius and curved contour of microfibrous fuel cells having small radius and high curvature in the radial direction. Fiber networks formed by unidirectional or substantially unidirectional fiber elements of the present invention conform well to small cell structures and can be easily incorporated into the microfibrous fuel cells disclosed in Eshraghi patents and applications without damaging the monofilaments.

There are several advantages associated with the fiber-supported catalyst structure of the present invention. One is the dimensional stability of the MEA formed from fibers of high tensile strength (typically greater than 200 ksi). Microfibrous cells fabricated by the use of continuous carbon fibers in its catalyst layer show virtually little or no longitudinal expansion or contraction, regardless of the hydration state of the ion-exchange membrane. The second major advantage is that the catalyst matrix can be prepared independent of and away from the polymeric membrane at conditions that are typically hostile to polymeric materials (such as high temperature) and then incorporated into the membrane structure at a later point. Microfibrous cell catalyzation methods disclosed in prior Eshraghi patents lacked this unique feature.

Further, the application of the fiber-reinforced catalyst structure of the present invention is not limited to microfibrous fuel cells. Instead, such new fiber-reinforced catalyst structure comprising unidirectionally oriented or substantially unidirectionally oriented fibers can be used in conventional planar fuel cell systems or fuel cell systems of other configurations.

The fibers used for forming the electrocatalyst structure of the present invention may comprise any suitable conductive fibers of sufficient mechanical strength and sufficient corrosion-resistance, which include but are not limited to carbon fibers, conductive polymeric fibers, corrosion-resistant metal fibers, or any suitable composite fibers. Preferably, carbon fibers formed by carbonization of polyacrylonitrile (PAN), pitch, rayon, cellulose, phenolic resin, epoxy resin, phthalonitrile resin, aromatic acetylene-derived polymers, etc., are used to form the unidirectional or substantially unidirectional fiber network for supporting the electrocatalyst material. The PAN and pitch-based carbon fibers supplied by Cytec Engineering Materials at Anaheim, Calif. and the pitch-based carbon fibers manufactured by Nippon Graphite Fiber Corporation at Cypress, Calif. are examples of fibers that can be employed for practice of the present invention.

The fibers are preferably characterized by a cross-sectional diameter in a range of from about 0.1 micron to about 100 microns, more preferably from about 0.1 micron to about 20 microns, and most preferably from about 5 microns to about 10 microns. More preferably, such conductive fibers are characterized by the following properties:

TABLE 2

| | |
|---|---|
| Tensile Modulus (msi) | ~10-140 |
| Tensile Strength (ksi) | ~200-900 |
| Electrical Resistivity (μΩm) | ~2-30 |
| Thermal Conductivity (W/m · K) | ~5-700 |
| Filament Diameter (μ) | ~5-20 |
| Carbon Assay (%) | ~90-100 |

Continuous carbon fibers having filament counts ranging from 400 (0.4K) to 24,000 (24K) are particularly suitable.

FIG. 1 shows an exemplary fiber network formed by multiple unidirectional carbon fibers 10. Although only one layer of carbon fibers is shown herein for illustration purposes, in practice multilayer fiber networks are used for fabrication of the microfibrous fuel cells of the present invention.

Figure 2:
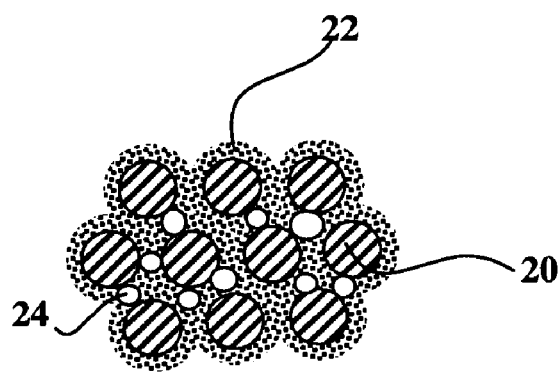
FIG. 2 shows a cross-sectional view of multiple parallel carbon fibers impregnated with an electrocatalyst material, according to one embodiment of the present invention.

FIG. 2 shows a partial cross-sectional view of an electrocatalyst layer according to one embodiment of the present invention, which comprises a fiber network formed of unidirectional carbon fibers 20 impregnated with electrocatalyst material 22. Additional carrier material 24 may be included in such fiber network, which can be subsequently removed to preserve interstitial spaces between the carbon fibers 20 and allow diffusion of fuel- or oxygen-containing fluid therethrough.

The electrocatalyst material employed by the present invention may be a noble metal or a noble metal alloy, such as platinum, gold, ruthenium, iridium, palladium, rhodium, and alloys thereof, or any other catalytically active material, such as nickel, iron, molybdenum, tungsten, niobium, and alloys thereof. Preferably, such catalytic material comprises platinum or a platinum alloy, such as platinum-ruthenium alloy, platinum-ruthenium-iron alloy, platinum-molybdenum alloy, platinum-chromium alloy, platinum-tin alloy, and platinum-nickel alloy.

Figure 3A:
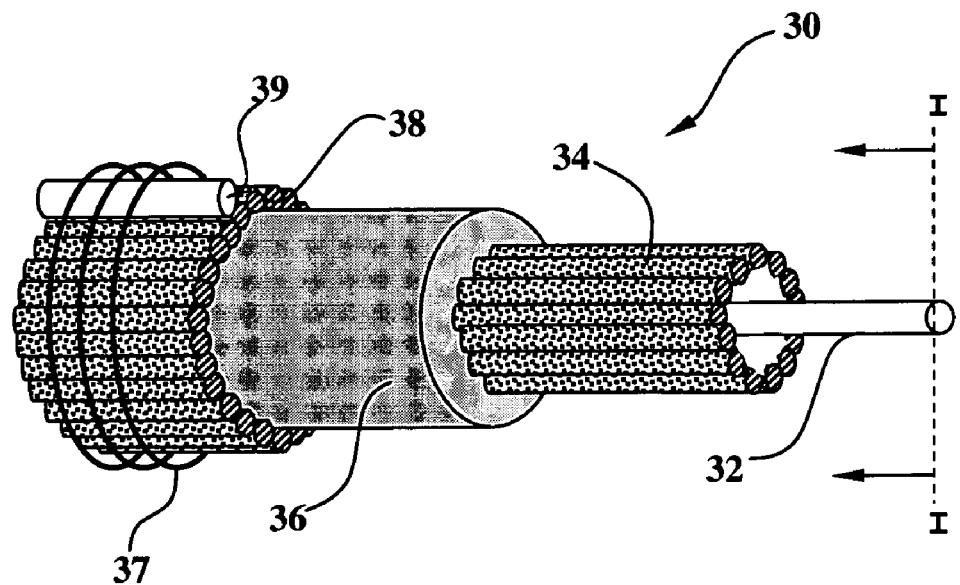
FIG. 3A shows a partial perspective view of a microfibrous fuel cell, according to one embodiment of the present invention.

FIG. 3A shows a microfibrous fuel cell structure 30, according to one embodiment of the present invention, which comprises an inner current collector 32, an inner electrocatalyst layer 34 comprising a unidirectional fiber network impregnated with an electrocatalyst material as described hereinabove, a membrane separator layer 36, an outer electrocatalyst layer 38 comprising also a unidirectional fiber network impregnated with the electrocatalyst material, and an outer current collector 39. A wrapping fiber 37 wraps around all the components so as to form an integral and unitary fuel cell structure. Please note that although FIG. 3A only shows a fiber network comprising one layer of fibers for illustration purposes, in reality multilayer fiber networks are produced when fuel cells are fabricated according to the embodiments of this invention.

Figure 3B:
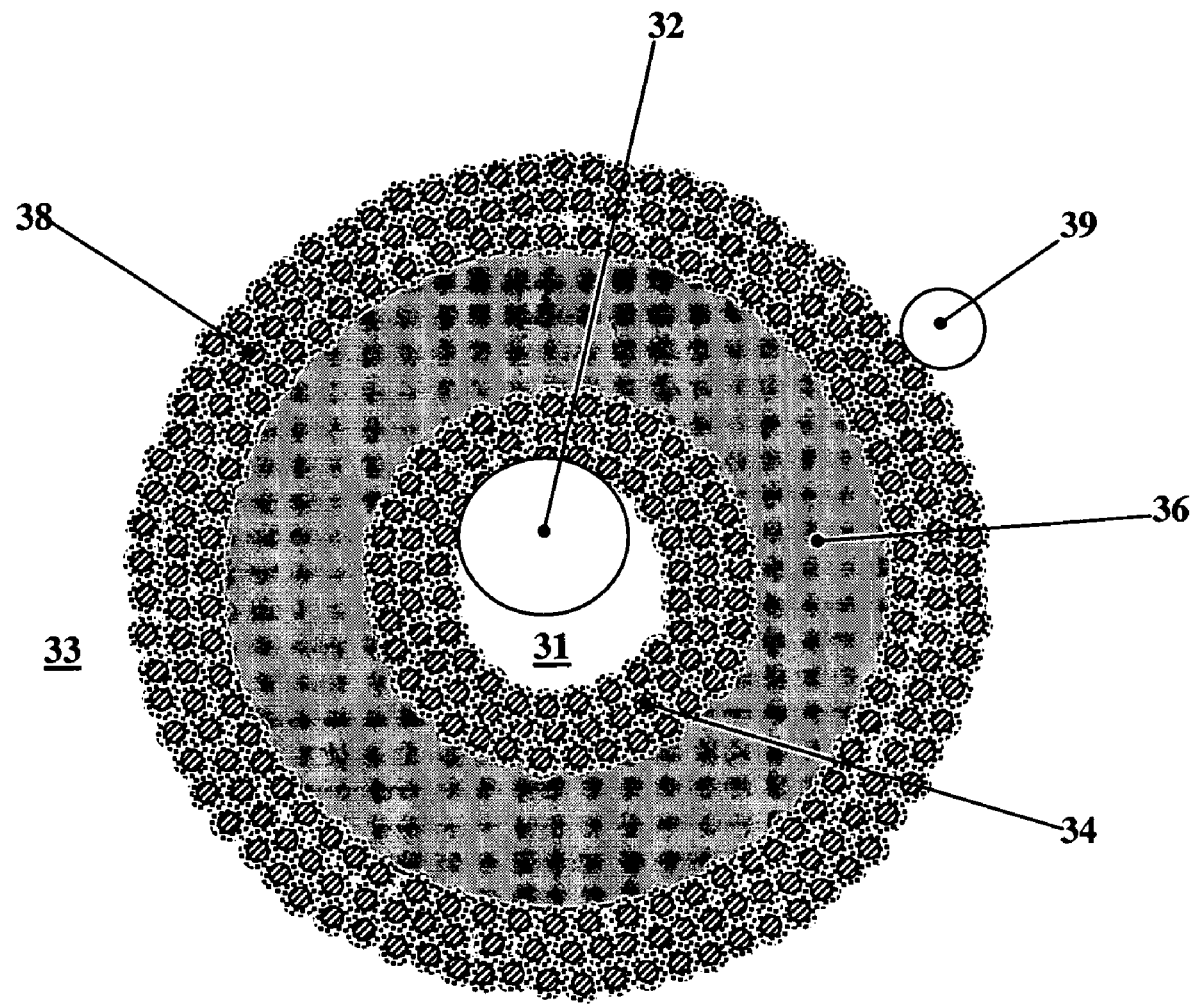
FIG. 3B shows a cross-sectional view of the microfibrous fuel cell of FIG. 3A from line I-I.

FIG. 3B shows a cross-sectional view of the microfibrous fuel cell structure 30 in FIG. 3A, as view from the I-I line. The hollow fibrous membrane separator 36 defines a bore side and a shell side, wherein the inner current collector 32 and the inner electrocatalyst layer 34 are located at the bore side, and wherein the outer current collector 39 and the outer electrocatalyst layer 38 are located at the shell side. An inner fluid passage 31 is provided at the bore side between the inner current collector 32 and the inner electrocatalyst layer 34 for flow of a fuel-containing or oxygen-containing fluid therethrough, while the shell side of the membrane separator 36 provides an outer fluid passage for flow of an oxygen-containing or a fuel-containing fluid.

The hollow fibrous membrane separator comprises an electrolyte medium, which can be either a liquid electrolyte medium or a solid electrolyte medium. Such hollow fibrous membrane separator may be microporous, with liquid or solid electrolyte medium impregnated in micropores of such membrane separator. Alternatively, such hollow fibrous membrane separator is itself a solid ion-exchange membrane, which consists essentially of either a solid ion-exchange ceramic material or a solid ion-exchange polymeric material, and which functions both as the membrane matrix for providing structural support and the electrolyte medium for carrying out the electrochemical reaction. Preferably, the membrane separator comprises a solid ion-exchange polymer (i.e., either a cationic exchange polymer or an anionic exchange polymer) selected from the group consisting of perflurocarbon-sulfonic-acid-based polymers, polysulfone-based polymers, perfluorocarboxylic-acid-based polymers, styrene-vinyl-benzene-sulfonic-acid-based polymers, and styrene-butadiene-based polymers. Examples of ion-exchange polymeric membrane suitable for use in the present invention include the NAFION® ionomer membrane manufactured by DuPont at Fayetteville, N.C.; the FLEMION® ionomer membrane manufactured by Asahi Glass Company at Tokyo, Japan; the ACIPLEX® ionomer membrane manufactured by Asahi Chemical Company at Osaka, Japan; and the Dow XUS membrane produced by Dow Chemical at Midland, Mich.

The electrocatalyst structures of the present invention are characterized by reduced catalyst loading, increased mechanical strength, and enhanced structure integrity, in comparison with the catalyst structures previously disclosed by the Eshraghi patents and applications.

Further, the inner and outer electrocatalyst layers of the present invention may contain electrocatalyst material only at one side of the unidirectional carbon fiber network, in order to reduce the amount of catalyst used.

One additional advantage of the electrocatalyst structure lies in the thermal conductivity of the unidirectional fibers incorporated therein, which concurrently facilitate removal of the heat from the electrochemical reaction site to the surface of the fiber network.

The electrocatalyst structure of the present invention may be formed by first providing a catalytic precursor structure that comprises a unidirectional fiber network impregnated with electrocatalyst material and then incorporating such catalytic precursor structure into a microfibrous fuel cell to form the inner and/or outer electrocatalyst layer described hereinabove.

Such catalytic precursor structure may be formed by catalyzing an already-assembled unidirectional fiber network, or by assembling individually catalyzed conductive fibers into a unidirectional fiber network. In either manner, the fabrication of such catalytic precursor structure involves two steps: (1) fiber network assembling, and (2) catalyzation, which can be carried out concurrently or sequentially in any order.

Catalyzation of the fibers or the fiber network can be carried out using any suitable methods, including but not limited to ink coating, electrochemical deposition, sputtering or plasma vapor deposition, chemical vapor deposition, etc.

Specifically, an ink paste containing at least an electrocatalyst material, a solvent, and a binder material, as disclosed in the Eshraghi patents U.S. Pat. Nos. 5,916,514; 5,928,808; 5,989,300; 6,004,691; 6,338,913; 6,399,232; 6,403,248; 6,403,517; 6,444,339; and 6,495,281, is provided for coating the conductive fibers or the fiber network. The conductive fibers or the fiber network may be catalyzed, by continuously running such fibers through a catalyst ink bath, spraying the catalyst ink paste on to the fibers through a spray nozzle, or otherwise applying the catalyst ink paste using any suitable applicator.

Electrochemical deposition can alternatively be used to deposit a thin layer of electrocatalyst material on the conductive fibers or the fiber network. For example, the conductive fibers or the fiber network can be passed through an electrochemical solution that contains an electrolytic salt of the electrocatalytic material. A cathode (i.e., the working electrode) is connected to the conductive fibers or the fiber network, and an anode (i.e., the counter electrode) containing the electrocatalytic material to be deposited is immersed in the electrochemical solution in vicinity of the conductive fibers or the fiber network.

The fibers or the fiber network can also be catalyzed by sputtering or plasma vapor deposition, in which the electrocatalyst material is first vaporized through ion bombardment in an inert gas plasma and subsequently deposited on the fibers or fiber network as a thin electrocatalyst film.

Further, the fibers or the fiber network can be catalyzed by chemical vapor deposition, in which a precursor compound is vaporized and then chemically decomposed to form a thin electrocatalyst film on such fibers or the fiber network.

Assembling of the fiber network from a tow of monofilaments, either in catalyzed form or uncatalyzed form, can be carried out by any suitable methods. In general, a fiber network is fabricated by binding the monofilaments of a tow of fibers having good electrical conductivity with a binding composition. The binding composition preferably comprises an ionically or an electrically conductive material, or both. Examples of such binding composition may include Nafion or a mixture of Nafion and carbon particles. The binding composition can be applied as a solution or a paste. The binding composition may further comprise a carrier material that can later be removed. For example, a Nafion binding solution can be mixed with a removable carrier material such as $Y_2O_3$ particles and then applied to the tow of carbon fibers. The $Y_2O_3$ carrier is then removed at a later stage by soaking the fiber network or the fully constructed fuel cells in an acid solution. Many other carriers such as metal powders, soluble salts, etc. can be used instead of $Y_2O_3$. Additional materials that can favorable alter the properties of the binding composition may also be added. Examples of such materials include, but are not limited to, polyethylene glycol (PEG), polyvinyl alcohol (PVA), polyvinyl pyrrolidone (PVP), glycerol, etc. The binding composition may further include a material for imparting hydrophobicity to the carbon fiber network. Examples of such materials are polytetrafluoroethylene (PTFE), Tetrafluoroethylene (TFE), other hydrophobic fluoropolymers, hydrophobic fused silica, etc. Fluoropolymers such as PTFE can themselves be used as a binder. For example, a solution containing PTFE particles can be applied to the tow of carbon fibers, dried and sintered at about 250° C. to 400° C. to form a coherent carbon ribbon.

In a preferred embodiment of the present invention, the fiber network is arranged and configured in form of a flat ribbon, which can be bound to a microfibrous current collector or a microfibrous membrane separator to form the respective electrocatalyst layers.

Figure 4:
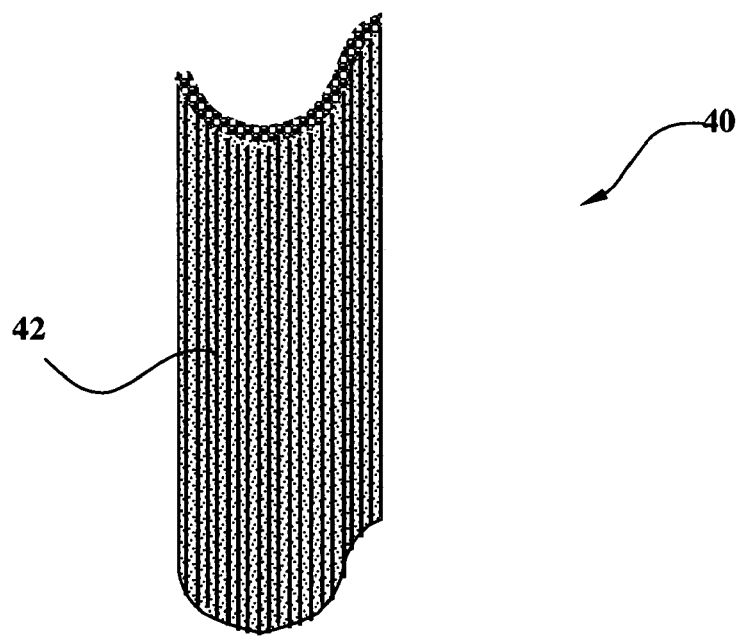
FIG. 4 shows a perspective view of a catalyzed carbon ribbon containing multiple parallel carbon fibers, according to one embodiment of the present invention.

FIG. 4 illustrates a catalyzed carbon ribbon 40 comprising multiple unidirectional carbon fibers 42. The thickness of such catalyzed carbon ribbon 40 preferably ranges from about 5 to about 100 microns, and more preferably from about 20 to about 50 microns, and such carbon ribbon 40 may comprises multiple layers of unidirectional carbon fibers, although only a single layer is illustrated herein for simplicity.

Figure 5:
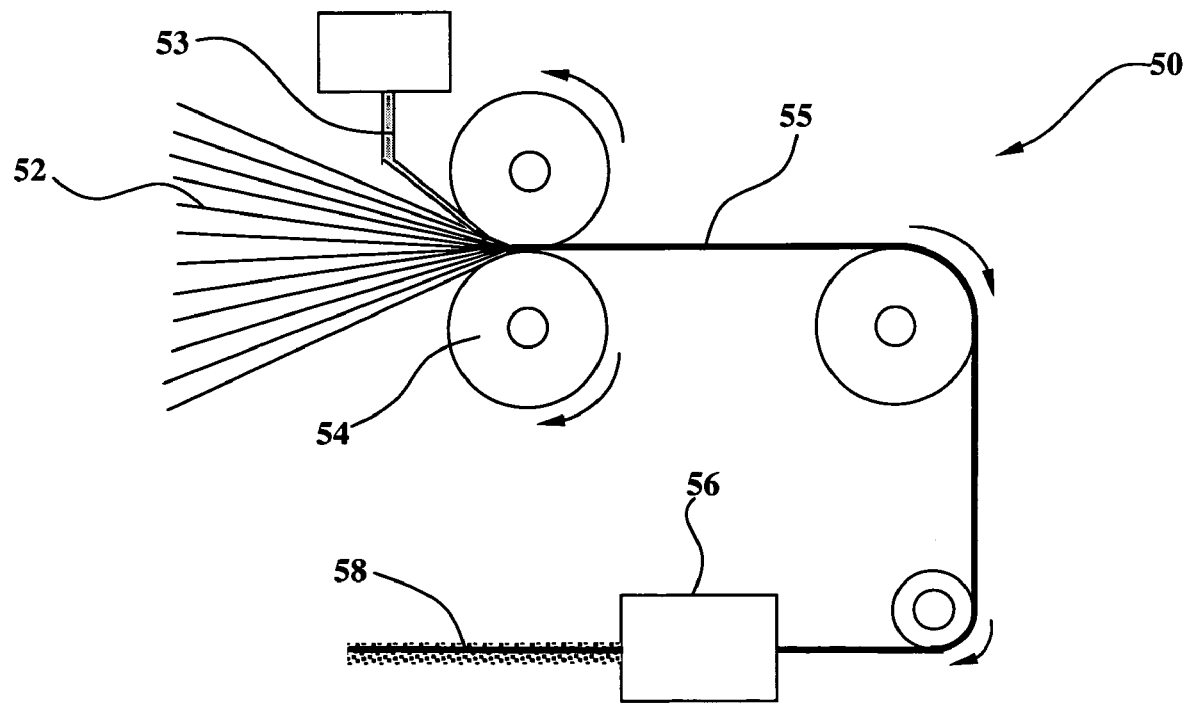
FIG. 5 illustrates the process for fabricating a catalyzed carbon ribbon, according to one embodiment of the present invention.

FIG. 5 shows a processing system 50 for fabricating a catalyzed carbon ribbon 58, according to one embodiment of the present invention. Specifically, a tow of carbon fibers 52 is aligned and concurrently passed through rollers 54 with a binding composition 53, to form a continuous carbon ribbon 55. The carbon ribbon 55 is subsequently fed to a catalyzation chamber 56 for impregnation of an electrocatalyst material therein. The catalyzation chamber 56 may consist of a roller and applicator assembly for applying a catalyst ink paste, a sputtering or deposition chamber, a spraying nozzle, a coating assembly, or any other catalyzation devices for applying electrocatalyst material to the carbon ribbon.

One or more such catalyzed carbon ribbons can then be attached to a fibrous substrate (i.e., a microfibrous current collector or membrane separator) to form an inner or outer electrocatalyst layer of a microfibrous fuel cell. Depending on the specific type of fibrous substrate, an adhesion composition comprising a suitable adhesion material can be used to improve cohesion between the catalyzed carbon ribbons and the fibrous substrate. For example, when the fibrous substrate consists either the inner current collector itself or an inner current collector coated with a removable substrate material (such as PVP, PVA, or PEG), the adhesion material is preferably PVP, PVA, or PEG, which can be subsequently removed to form a lumen between the inner current collector and the electrocatalyst layer. On the other hand, if the fibrous substrate comprises the membrane separator, the adhesion material is preferably a solution of the membrane-forming polymers (such as a Nafion solution), which facilitates formation of a bond between the electrocatalyst layer and the membrane separator.

FIGS. 6A and 6B illustrate formation of an electrocatalyst layer, by wrapping one catalyzed carbon ribbon 64 around a fibrous substrate 62, while FIGS. 7A and 7B demonstrate formation of an electrocatalyst layer by attaching two catalyzed carbon ribbons 74A and 74B to a fibrous substrate 72.

Alternatively, the electrocatalyst structure of the present invention may be formed in situ by coating one or more uncatalyzed fiber networks that each comprises multiple continuous conductive fibers onto a microfibrous substrate, concurrently with a catalyst composition containing the electrocatalyst material, to form a fiber network that is impregnated with electrocatalyst material and comprising unidirectionally arranged conductive fibers. Further, such electrocatalyst structure can be formed by directly coating multiple continuous conductive fibers onto the microfibrous substrate concurrently with a catalyst/binding composition that contains the electrocatalyst material as well as a binder material as described hereinabove.

Figure 8:
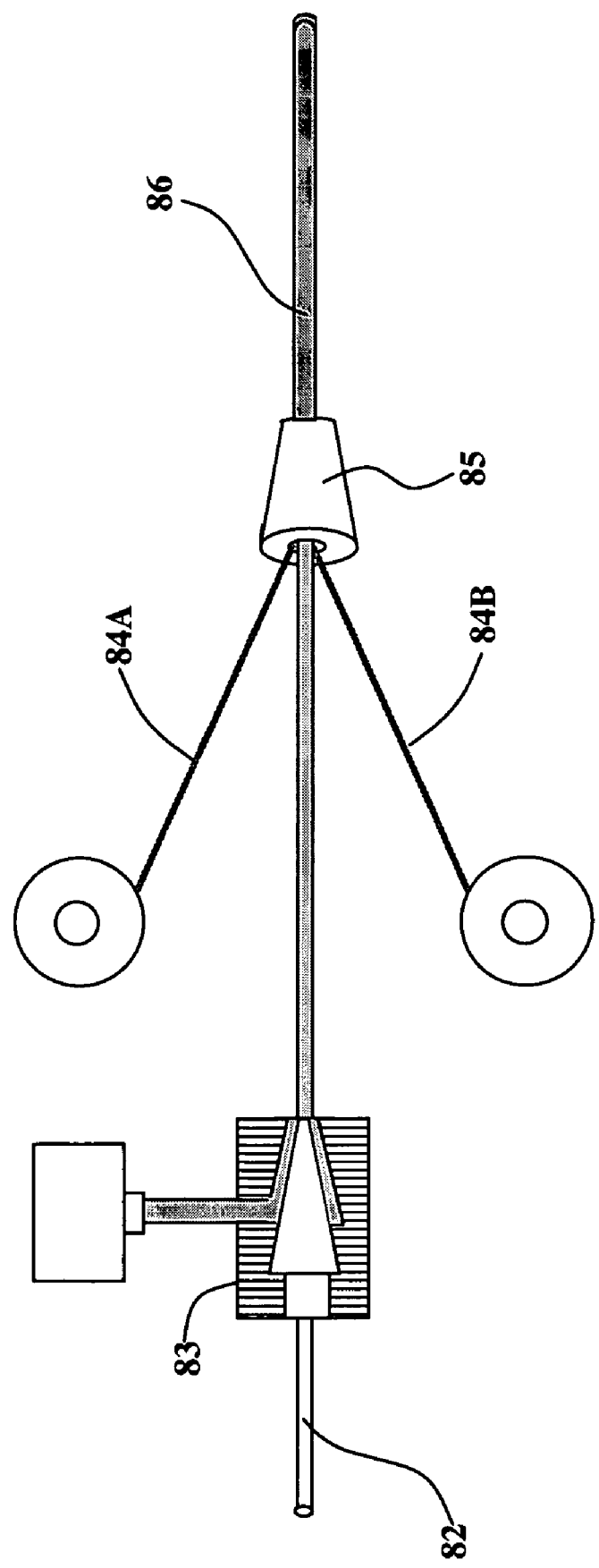
FIG. 8 illustrates the process for forming an electrocatalyst layer over a microfibrous substrate, according to one embodiment of the present invention.

FIG. 8 shows an example of an apparatus for continuously and automatically forming an electrocatalyst layer over a fibrous substrate. A fibrous substrate 82 is first passed through an applicator die 83 to form a coating of an adhesion composition onto such fibrous substrate 82. The coated fibrous substrate 82 is then fed through an applicator die 85, concurrently with two continuous catalyzed carbon ribbons 84A and 84B provided by two spools. The applicator die 83 is sized to force the carbon ribbons 84A and 84B to conform to the contour of the fibrous substrate 82 and adhere to the same, thereby forming a coated fiber 86 containing a carbon-fiber-supported electrocatalyst layer. Although FIG. 8 illustrates use of two catalyzed carbon ribbons, any number of carbon ribbons fabricated according to the embodiment of the present invention can be used for forming the electrocatalyst layer.

The choice of the adhesion composition may vary, depending on whether the catalyzed fiber ribbons are being bound to a current collector or a membrane layer. Examples of adhesion materials that can be used to attach the carbon ribbons to the current collector include, but are not limited to, PEG, PVP, and/or PVA dissolved in a solvent. For temporary on-line binding, viscous liquids such as glycerol or low molecular weight PEG may be used. To attach the carbon ribbons to the membrane layer, on the other hand, an adhesion solution or paste containing at least an ion-exchange polymer (such as Nafion) dissolved in a solvent can be used.

In another embodiment of the present invention, multiple conductive fibers or uncatalyzed fiber networks or carbon ribbons containing multiple conductive fibers are coated either simultaneously or sequentially with a catalyst composition containing the electrocatalyst material onto a fibrous substrate, for in situ catalyzation of the fibers or the fiber networks. Such catalyst composition may comprise an ink paste that contains the electrocatalyst material, a solvent, a binder material, etc., as disclosed in U.S. Pat. Nos. 5,916,514; 5,928,808; 5,989,300; 6,004,691; 6,338,913; 6,399,232; 6,403,248; 6,403,517; 6,444,339; and 6,495,281. In such manner, separate catalyzation of the fibers or the fiber networks is not required, and the fuel cell fabrication process can be further simplified.

A microfibrous fuel cell comprising such fiber-supported electrocatalyst layers may be fabricated by using a removable substrate material or a swellable membrane separator as disclosed in U.S. patent application Ser. No. 10/744,203 filed on Dec. 23, 2003 for "SUBSTRATE-SUPPORTED PROCESS FOR MANUFACTURING MICROFIBROUS FUEL CELLS" and issued on Apr. 8, 2009 as U.S. Pat. No. 7,354,545, and U.S. patent application Ser. No. 10/811,347 filed on Mar. 26, 2004 for "PROCESS FOR MANUFACTURING HOLLOW FIBERS," and published Oct. 7, 2004 as U.S. Patent Application Publication 2004/0197557, the contents of which are incorporated herein by reference, in their respective entireties and for all purposes.

Specifically, a microfibrous inner current collector is provided, over which are sequentially formed: (1) at least one layer of a removable substrate material, (2) an inner electrocatalyst layer, (3) a membrane separator layer, and (4) an outer electrocatalyst layer. The at least one layer of removable substrate material is subsequently removed to provide a fluid passage between the inner current collector and the inner electrocatalyst layer, and an outer current collector is placed adjacent to the outer electrocatalyst layer so as to form a complete microfibrous fuel cell. The removable substrate material may be any suitable material that is subsequently and selectively removable. For example, such removable substrate material can be selectively sublimable, meltable, or soluble under specific conditions, which is subsequently and selectively removed via sublimation, melting, or dissolution under such conditions. Preferably, the removable substrate material is a soluble material, and more preferably a water-soluble polymeric material that is selectively removable by water. Suitable water-soluble polymeric materials include, but are not limited to, polyvinyl pyrrolidones (PVP), polyvinyl alcohols (PVA), polyethylene glycols (PEG), etc.

Coating of the removable substrate material onto the inner current collector can be carried out by various methods, including melt extrusion, solution extrusion, spray coating, brush coating, dip-coating, and vapor deposition. Melt extrusion and solution extrusion are preferred in the present invention, by providing a viscous extrudate, which comprises either a molten removable substrate material, or a viscous solution of the removable substrate material dissolved in a suitable solvent, and concurrently passing such viscous extrudate and the solid core fiber through an extrusion die, to form a coated current collector with a coating of the removable substrate material. The coated current collector is then cooled and/or dried for a sufficient period of time to solidify the removable substrate material coating.

Alternatively, the microfibrous fuel cell can be formed by first providing a microfibrous core fiber, and then sequentially forming over such core fiber: (1) an inner electrocatalyst layer, (2) a swellable membrane separator layer comprising a swellable polymeric material, and (3) an outer electrocatalyst layer. The swellable membrane separator is subsequently contacted with a swelling agent to cause expansion of such membrane separator, which results in detachment of the core fiber from the swellable membrane separator layer as well as from the inner electrocatalyst layer. The detached core fiber is then removed to form a hollow fibrous membrane separator having a bore side and a shell side. An inner current collector having a cross-sectional diameter that is smaller than that of the removed core fiber is inserted into the bore of the membrane separator, leaving an inner fluid passage thereat, and an outer current collector is placed at the shell side of the membrane separator, forming a complete microfibrous fuel cell.

The swelling agent can be any liquid or gas that interacts with a polymeric membrane-forming material and causes such material to undergo volumetric expansion, and is preferably a liquid solvent, such as water or an organic solvent. The swellable polymeric membrane-forming material preferably comprises an ion-exchange polymer selected from the group consisting of perflurocarbon-sulfonic-acid-based polymers and polysulfone-based polymers, more preferably a perfluorosulfonate ionomer, such as the NAFION® ionomer membrane material manufactured by DuPont at Fayetteville, N.C.

Figure 9:
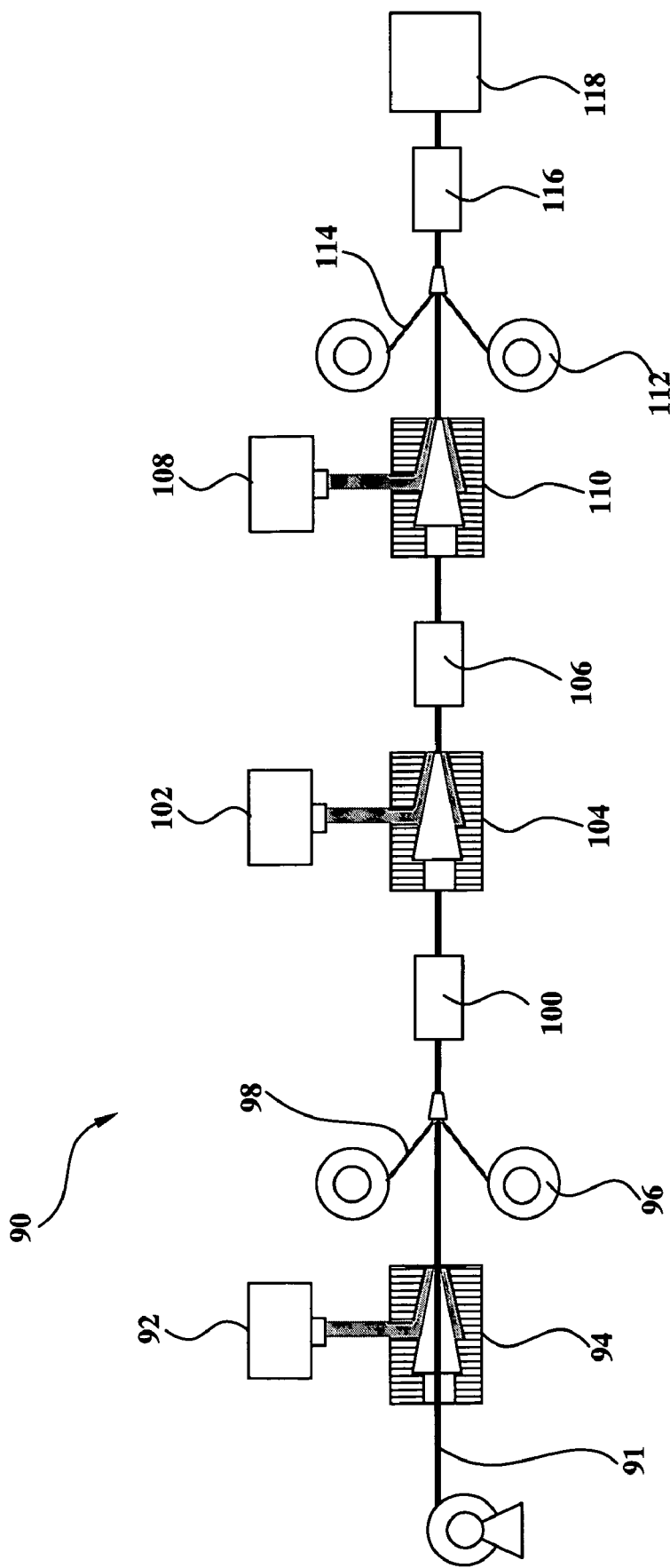
FIG. 9 demonstrates a continuous production line for fabricating microfibrous fuel cells, according to one embodiment of the present invention.

FIG. 9 illustratively depicts an example of a processing system 90 for continuously forming a microfibrous fuel cell, according to one embodiment of the present invention.

A microfibrous inner current collector 91, or an inner current collector coated with a removable substrate material, is continuous and sequentially passed through: (a) a first extrusion die 94, which is connected with reservoir 92 that contains an adhesion composition (optionally comprising catalyst material for in situ catalyzation of uncatalyzed carbon ribbons), thereby forming a thin adhesion (or adhesion/catalyzation) layer thereover; (b) spools 96, which supply catalyzed carbon ribbons, uncatalyzed carbon ribbons, or simply carbon fibers 98, which form a fiber-supported inner electrocatalyst layer either alone or in conjunction with the adhesion/catalyzation composition supplied by the first extrusion die 94; (c) optionally, a heating and/or drying zone 100; (d) a second extrusion die 104, which is connected with reservoir 102 containing a membrane-forming material to form a membrane-forming material layer over the inner electrocatalyst layer; (e) a heating/drying zone 106, which heats such membrane-forming material layer at a temperature of from about 25° C. to about 200° C. to provide a solidified membrane separator; (f) a third extrusion die 110, which is connected with reservoir 108 that contains an adhesion composition (optionally comprising catalyst material for in situ catalyzation of uncatalyzed carbon ribbons), thereby forming a thin adhesion (or adhesion/catalyzation) layer over the membrane separator; (g) additional spools 112, which supply catalyzed carbon ribbons, uncatalyzed carbon ribbons, or simply carbon fibers 114, which form a fiber-supported outer electrocatalyst layer over the membrane separator, either alone or in conjunction with the adhesion/catalyzation composition supplied by the third extrusion die 110; (h) a heating and/or drying zone 116; and (i) a cutter 118, which cuts the fabricated fibrous cell to predetermined lengths.

A complete microfibrous fuel cell is formed, by subsequently removing the removable substrate material or exposing the membrane separator to a swelling agent, and then attaching an outer current collector to the shell side of the fibrous cell. Such complete microfibrous fuel cell comprises a hollow microfibrous membrane separator having an inner current collector and an inner electrocatalyst layer at the bore side and an outer current collector and an outer electrocatalyst layer at the shell side.

The above-described systems and methods are provided solely for illustration purposes, without limiting the broad scope of the present invention, and a person ordinarily skilled in the art can readily modify one or more steps described herein, consistent with the operating principles of the present invention and without undue experimentation. For example, the microfibrous fuel cell of the present invention can be formed by discrete process steps in separate processing systems.

Although the specific examples provided hereinabove refer to usage of carbon ribbons, ribbon structure containing any suitable conductive fibers (such as metal fibers or conductive polymer fibers) can be readily used for the practice of the present invention.

Multiple microfibrous fuel cell of the present invention may be assembled to form a fuel cell assembly. Such fuel cell assembly may comprise serially and/or parallelly connected fuel cells, which provides higher voltage and/or higher current in comparison with an individual fuel cell. Such fuel cell assembly is further potted and packaged, and then placed in a housing, which provides a first fluid passage for flowing a fuel-containing fluid through either the bore sides or the shell sides of the fuel cells and a second fluid passage for flowing an oxygen-containing fluid through opposite sides of the fuel cells.

Figure 10:
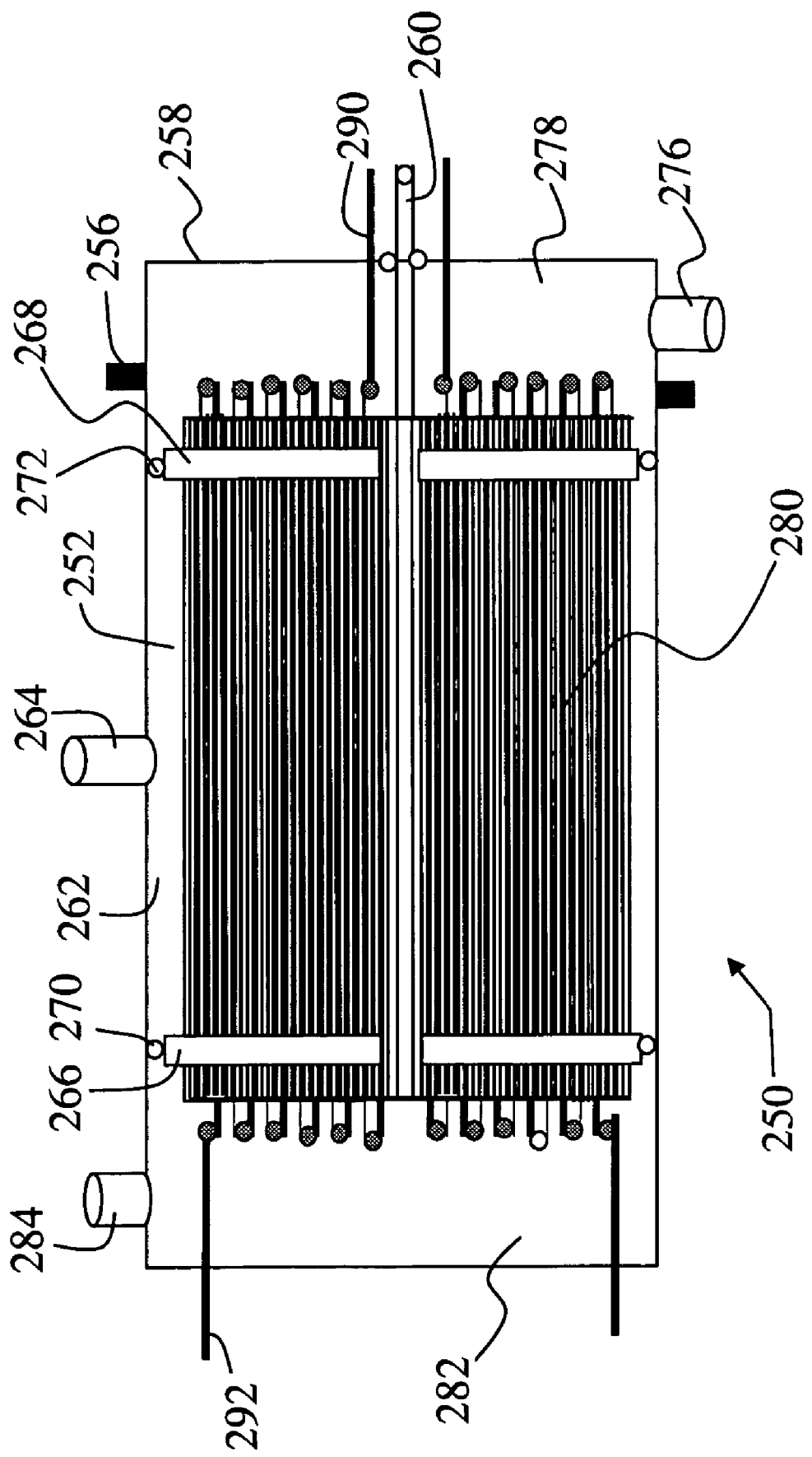
FIG. 10 shows a microfibrous fuel cell assembly comprising multiple microfibrous fuel cells connected and packed together to form a compact unit, according to one embodiment of the present invention.

FIG. 10 shows a sectional elevation view of a system 250 including a fuel cell bundle 280, which comprises multiple serially and/or parallelly connected microfibrous fuel cells of the present invention, and which is potted at respective ends thereof by potting members 266 and 268. The fuel cell bundle 280 is leak-tightly secured to the inner surface of a housing 252 by O-ring elements 270 and 272.

The housing 258 has a flange element 256 joining the end section 258 of the housing with the central section. The central section of the housing 252 contains an interior volume 262, which is separated from the right end volume 278 by potting member 268 and from the left end volume 282 by potting member 266. Inlet 276 communicates with the right end volume 278, and the left end volume 282 communicates with the outlet 284.

Outlet 264 communicates with the interior volume 262. Feed tube 260 extends into the center of the fuel cell bundle 280 in the interior volume 262, and is perforated along its length to introduce feed fluid (either a fuel-containing or an oxygen-containing fluid) to the shell sides of the microfibrous fuel cells in the fuel cell bundle 280 in the interior volume, with the effluent fluid being discharged through outlet 264. Feed fluid (either an oxygen-containing fluid or a fuel-containing fluid) introduced into end volume 278 from inlet 276 flows through the bore sides of the microfibrous fuel cells in the fuel cell bundle 280, and flows out of the bundle into end volume 282, following which it is discharged from the housing 252 through outlet 284.

Either the inner or the outer current collectors are joined to terminal 292 in the end volume 282, with the terminal structure extending exteriorly of the housing 252. At the opposite end volume 278, the other ones of the inner and outer current collectors are joined to terminal 290, which extends exteriorly of the housing 252.

Therefore, the housing 252 provides a first fluid passage, which is composed of the inlet 276, the end volumes 278 and 282, and the outlet 284, for flowing a fuel-containing or an oxygen-containing fluid through the bore sides of the microfibrous fuel cells, and a second fluid passage, which is composed of the feed tube 290, the central volume 262, and the outlet 264, for flowing an oxygen-containing or a fuel-containing fluid through the shell sides of the microfibrous fuel cells. The first fluid passage and the second fluid passage are separated from and sealed against each other in a leak-tight manner, by potting members 266 and 268 and O-ring elements 270 and 272.

The following examples are provided hereinafter regarding fabrication and measurement of exemplary microfibrous fuel cells and full cell assemblies containing fiber-supported electrocatalyst layers s, according to preferred embodiments of the present invention:

EXAMPLE 1

This example shows the procedure for preparing a single microfibrous fuel cell with carbon fiber-supported electrocatalyst layer, using a binding solution that contains NAFION® ionomer and a removable carrier $Y_2O_3$:

The processing steps were as follows:

First, a membrane-electrode-assembly (MEA) containing the inner electrocatalyst layer and the membrane separator layer was formed according to the continuous extrusion process disclosed in U.S. patent application Ser. No. 10/744,203 filed on Dec. 23, 2003 for "SUBSTRATE-SUPPORTED PROCESS FOR MANUFACTURING MICROFIBROUS FUEL CELLS" and issued on Apr. 8, 2009 as U.S. Pat. No. 7,354,545. The extrusion system was comprised of the following equipment:

Let-off stand for the current collector wire spool
Single-layer extrusion die for applying platinum ink to the wire
Piston pump for dispensing Pt ink catalyst
Single-layer extrusion die for applying Nafion® solution to the wire
Piston pump for dispensing Nafion® membrane-forming solution
Two medium wave infrared (IR) dryers—each 1 meter long
Belted pulling unit to move the wire through the process
Take-up unit to collect the final product on a spool The typical running parameters for the extrusion line were as follows:

TABLE 3

| Diameter of the substrate Ti wire (Inch) | Pt ink composition | Pt ink extrusion rate ($cm^3$/min/m) | NAFION® ionomer solution composition | NAFION® ionomer solution extrusion rate ($cm^3$/min/m) | Line Speed (m/min) |
|---|---|---|---|---|---|
| 0.024 | 80 wt % Pt 20 wt % NAFION® ionomer 40 wt % Solid | 0.03-0.12 | 35-38 wt % | 0.35-0.8 | 0.5-2 |

The NAFION® ionomer solution extrudate was obtained by an evaporation method starting with a 20 wt % NAFION® ionomer solution of 1100 EW in a mixture of alcohols and water (DuPont Fluoroproducts, Fayetteville, N.C.). Pt ink was prepared by mixing Platinum powder (Alfa Aesar, Ward Hill, Mass.) with 20 wt % NAFION® ionomer solution of 1100 EW in a mixture of alcohols and water. Final NAFION® ionomer content in the ink was about 20 wt %. The solid content of the ink was adjusted by evaporating certain amount of solvent to reach a viscosity suitable for extrusion. The Pt loading varied between about 0.08 mg/$cm^2$ to about 2 mg/$cm^2$, depending on the pumping rate. The membrane thickness was about 50-80 μm.

Carbon fibers were then catalyzed to form carbon ribbon according to the process illustrated in FIG. 5. Specifically, carbon fiber (1000 filament, YSH-50A, Nippon Graphite Fiber Corporation, Cypress, Calif.) was first passed through a binding solution (reference numeral 53 in FIG. 5) that contains NAFION® ionomer and a removable carrier material and then through a Pt catalyst ink solution (as in the catalyzation chamber 56 of FIG. 5) before being wound onto a spool.

The Nippon Carbon fibers designated as YSH-50A had the following properties:

TABLE 4

| | |
|---|---|
| Tensile Modulus (msi) | 75 |
| Tensile Strength (ksi) | 570 |
| Electrical Resistivity (μΩm) | 7 |
| Thermal Conductivity (W/m · K) | 140 |
| Filament Diameter (μ) | 7 |
| Carbon Assay (%) | ~99 |

The binding solution was prepared by mixing a removable carrier material $Y_2O_3$ (1 μm, Stanford Materials Corporation, Aliso Viejo, Calif.) and a 20 wt % NAFION® ionomer solution of 1100 EW in a mixture of alcohols and water. The ratio of $Y_2O_3$ to NAFION® ionomer in the binding solution was about 60 wt %:40 wt %. 1-propyl alcohol (Fisher Scientific, Chicago, Ill.) was added to adjust the solid content (removable carrier plus NAFION® ionomer) to about 2.5 wt %.

Pt ink was prepared by mixing Pt black powder with a 20 wt % NAFION® ionomer solution of 1100 EW in a mixture of alcohols and water. The ratio of Pt to NAFION® ionomer in the ink was about 85 wt %:15 wt %. 1-propyl alcohol was added to adjust the solid content (Pt plus NAFION® ionomer) to about 20 wt %.

The ribbon production line was run at a speed of about 1.5 m/min.

Two catalyst-impregnated carbon ribbons were bonded onto the shell side of the membrane separator according to the process illustrated in FIG. 8. Specifically, the membrane-electrode-assembly (MEA) containing the inner electrocatalyst layer and the membrane separator was passed through an applicator die 83 filled with a binding solution. The MEA and the catalyzed carbon ribbons were then continuously fed through a second applicator die 85. The fiber so formed was then dried by passing through a heating tube at about 90° C. and subsequently cut to 9-inch-long MEA for processing and testing. The running conditions were as following:

The binding solution: 5% NAFION® ionomer solution.
The size of the applicator die for binding solution: ~900 μm.
The size of the applicator die for carbon ribbons: ~1100 μm.
The running speed of the cutter: 1 m/min.

The Pt loading at the shell side of the membrane separator, as contained in the fiber-supported electrocatalyst layer formed by the catalyzed carbon ribbons, varied between about 0.5 to about 3 mg/cm², depending on the pumping rate.

The MEAs were heat-set sequentially at about 70° C. for 30 minutes and about 125° C. for 60 minutes. They were then immersed into a hot water bath (80-100° C.) for 10-20 minutes, which caused the NAFION® ionomer membrane separator layers to swell along their radial directions and became detached from the Ti wire substrates. The detached wire substrates were extracted form the bore side of the MEAs.

The MEAs with carbon-fiber-supported electrocatalyst layers exhibited excellent dimensional stability along its longitudinal axis even when boiled or immersed in hot water. In contrast, NAFION® ionomer-based MEAs lacking such fiber-supported electrocatalyst layer expanded significantly along its longitudinal axis.

The MEAs were then cleaned by using a 3 vol % aqueous $H_2O_2$ solution at about 60° C. for 60 minutes. After being rinsing with deionized water, the MEAs were boiled and exchanged in ~0.5N aqueous $H_2SO_4$ solution for about 2 hours. A 0.024" diameter Ti/Cu cladded wire with embedded U-channels (as described in U.S. patent application Ser. No. 10/855,927 filed May 27, 2004, and issued Nov. 4, 2004 as U.S. Pat. No. 7,473,490, the content of which is incorporated herein by reference in its entirety) was then inserted into the bore of each MEA as the inner current collector. The MEA was dried at about 70° C. for 30 min. A 0.015" diameter Ti/Cu cladded wire was placed on the shell side of the MEA as the outer current collector and wrapped together with a 0.008" diameter Ti wire, thereby forming a single microfibrous fuel cell with fiber-supported electrocatalyst layer.

Figure 11:
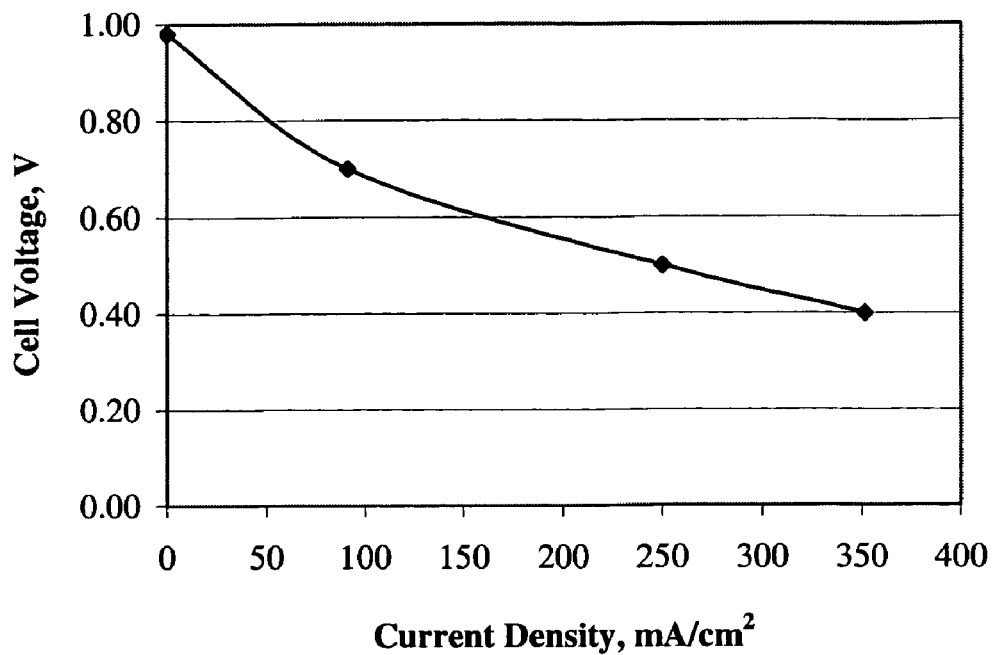
FIGS. 11-18 are polarization curves of exemplary microfibrous fuel cells and microfibrous fuel cell assemblies fabricated according to the present invention.

Such microfibrous fuel cell was tested in a tube at room temperature. The cell was 6" long with a cathode surface area of 2.92 cm². Air was passed through the bore of the cell, and $H_2$ was reacted on the shell of the cell at near ambient conditions. In this and all foregoing examples, dry air and $H_2$ were used directly from the corresponding gas cylinders without humidification. FIG. 11 shows the polarization curve of such a single microfibrous fuel cell.

EXAMPLE 2

This example illustrates the testing results of a sub-bundle formed of multiple microfibrous fuel cells with carbon fiber-supported electrocatalyst layer as fabricated in Example 1.

Eleven microfibrous fuel cells were bundled together around a ⅛" (OD) carbon tube and potted into a sub-bundle. The microfibrous fuel cells were uniformly arranged in a parallel configuration around the carbon tube, which was used as a heat exchange tube. Details of the heat exchange system as used in this example were disclosed in U.S. patent application Ser. No. 10/794,687 as filed Mar. 5, 2004, and issued Jun. 12, 2007 as U.S. Pat. No. 7,229,712, the content of which is incorporated herein by reference in its entirety. The fuel cells were connected in parallel with one another, i.e. outer current collector of each cell was connected together to form one terminal and inner current collector of each cell was connected together to form another terminal.

The active cathode surface area of the sub-bundle was about 32 cm². Air was passed through the bore side and $H_2$ was reacted on the shell of the fuel cells.

Flow rate for $H_2$: 10 (mL/min)/A.—No humidification
Flow rate for Air: 30 (mL/min)/A.—No humidification
$H_2$ was at near ambient pressure. The outlet of the air was at the ambient pressure, while the inlet pressure of the air ranged between about 0 psi to about 8 psi, depending on the flow rate. The cell temperature was maintained at 60-70° C. by controlling the coolant flow passed through the carbon heat exchange tube.

Figure 12:
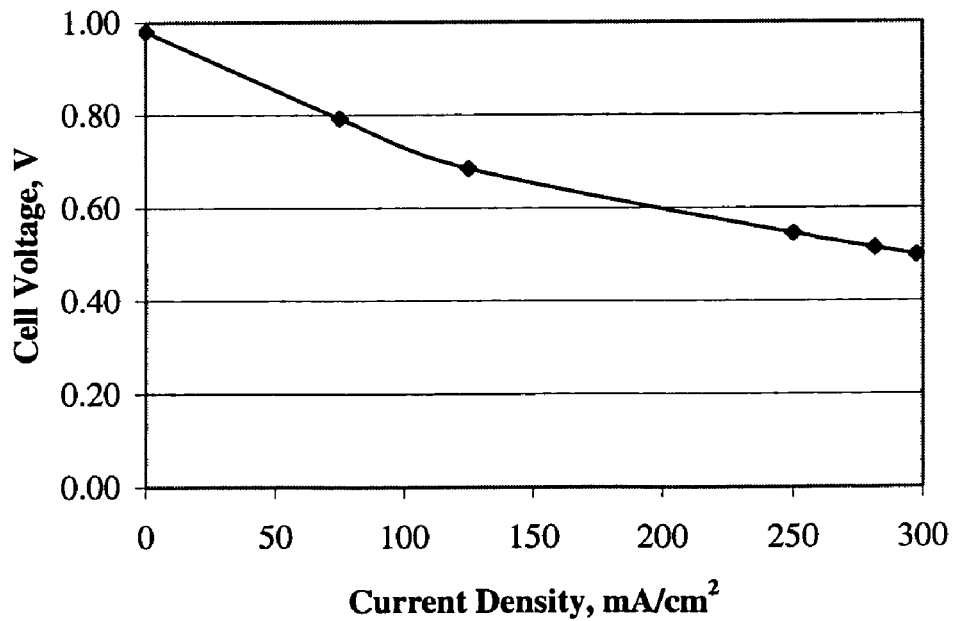

FIG. 12 shows the polarization curve of such sub-bundle.

EXAMPLE 3

Example 3 shows the performance of another sub-bundle made of the microfibrous fuel cells with carbon fiber-supported electrocatalyst layer as fabricated in Example 1.

Figure 13:
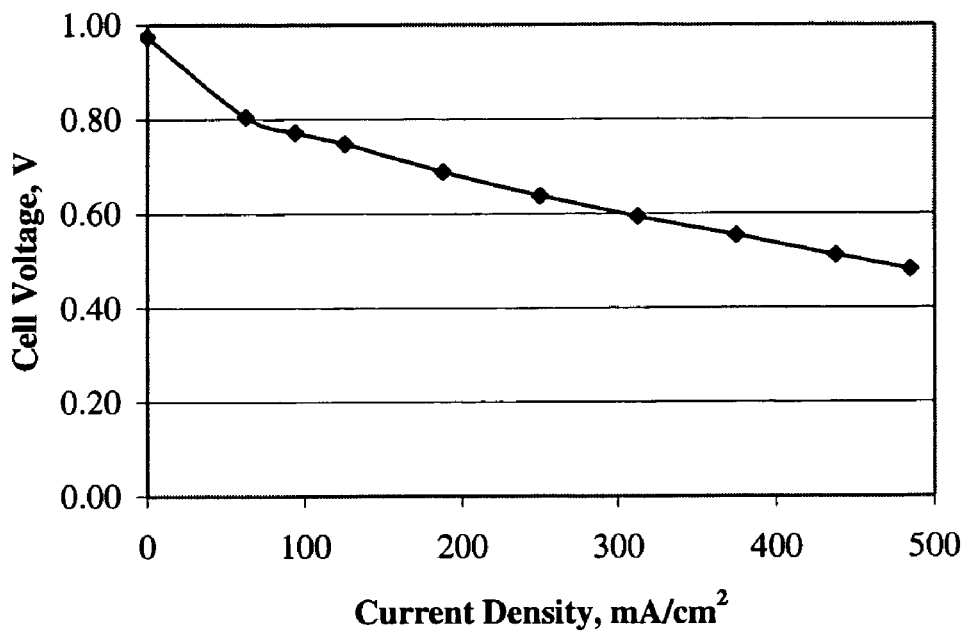

All parameters were the same as those in Examples 1 and 2, except:
Flow rate (or recirculation rate) for $H_2$: 25 (mL/min)/A;— No humidification Flow rate for Air: 30 (mL/min)/A;—No humidification
FIG. 13 shows the polarization curve of such sub-bundle.

EXAMPLE 4

This example illustrates the performance of a microfibrous fuel cell containing co-extruded inner electrocatalyst and membrane separator layers and a carbon fiber-supported outer electrocatalyst layer formed by using a Nafion® binding solution. In such co-extrusion process, a Nafion® membrane-forming solution and a catalyst ink solution were simultaneously extruded, overlaid, and dried.

Pt ink was prepared by mixing platinum powder with 10 wt % NAFION® ionomer aqueous solution of 1100 EW (Du-Pont Fluoroproducts, Fayetteville, N.C.). Final NAFION® ionomer content in the ink was about 20 wt %. The solid content of the ink was adjusted by evaporating certain amount of solvent to reach a viscosity suitable for extrusion. The membrane thickness was about 75 μm. All the other conditions and parameters were similar to those in Example 1.

Figure 14:
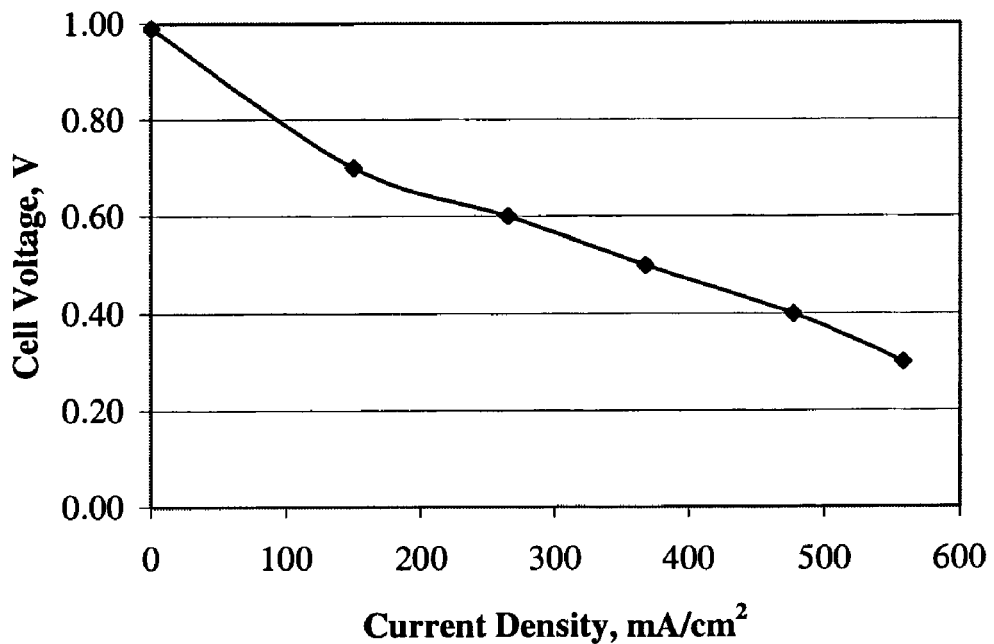

Testing was performed under the same conditions as those in Example 1. FIG. 14 shows the polarization curve of such microfibrous fuel cell.

EXAMPLE 5

This example shows the performance of a sub-bundle containing eleven microfibrous fuel cells, which included fiber-supported outer electrocatalyst layers formed by coating Pt/C-supported catalyst ink on carbon ribbons that were fabricated by using a NAFION® ionomer binding solution.

Pt/C ink was prepared by mixing Pt/C supported catalyst (20 wt % of Pt, HISPEC 3000, Johnson Matthey, West Deptford, N.J.) with 20 wt % NAFION® ionomer of 1100 EW in a mixture of alcohols and water. The ratio of Pt/C to NAFION® ionomer in the ink was about 50 wt %:50 wt %. 1-propyl alcohol was added to adjust the solid content (Pt/C plus NAFION® ionomer) to 10 wt %. All the other conditions and parameters were similar to those in Example 1.

Two Pt/C-coated carbon ribbons were bound to the shell side of the MEA by using a 5 wt % NAFION® ionomer solution as the binding solution. The Pt loading on the shell side of such MEA was estimated to be about 0.15 mg/cm².

Figure 15:
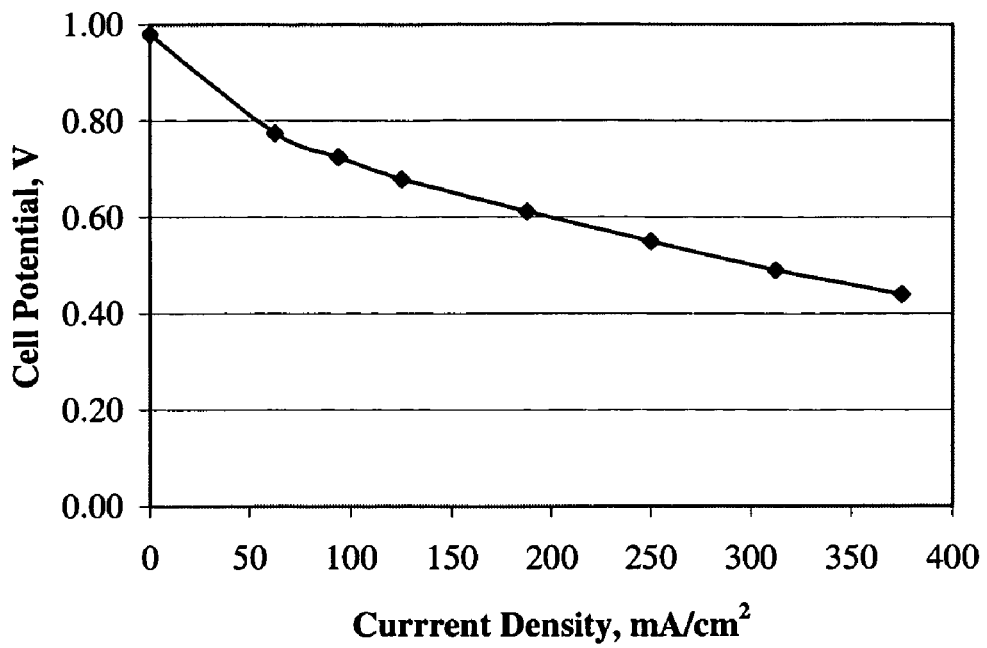

The performance data for such a sub-bundle is shown in FIG. 15. The sub-bundle had an active cathode surface area of about 32 cm². Air at 30 (mL/min)/A was passed through the bores of the fuel cells in such sub-bundle, and $H_2$ at 25 (mL/min)/A was reacted on the shells of the fuel cells at near ambient atmospheric pressure. The outlet of the air was at the ambient pressure. The inlet pressure of the air ranged between about 0 psi to about 8 psi, depending on the air flow rate. Testing was performed at 60° C.

EXAMPLE 6

This example shows the performance of a single microfibrous fuel cell having a fiber-supported outer electrocatalyst layer formed by coating a Pt/C-supported catalyst ink on carbon ribbons that were fabricated by using Pt/C ink as the binding solution.

Pt/C ink for making carbon ribbon was prepared in the same manner as described in Example 5. The Pt/C ink for the binding solution had the same composition as the Pt/C ink used for making carbon ribbon, except that the solid content of the ink was lowered to 5.0 wt %. Two Pt/C-coated carbon ribbons were bound to the shell side of the MEA by using such Pt/C ink as the binding solution. The total Pt loading on the shell (both from carbon ribbon and from binding solution) was estimated to be about 0.35 mg/cm²

All the other conditions and parameters were the same as those in Example 1.

Figure 16:
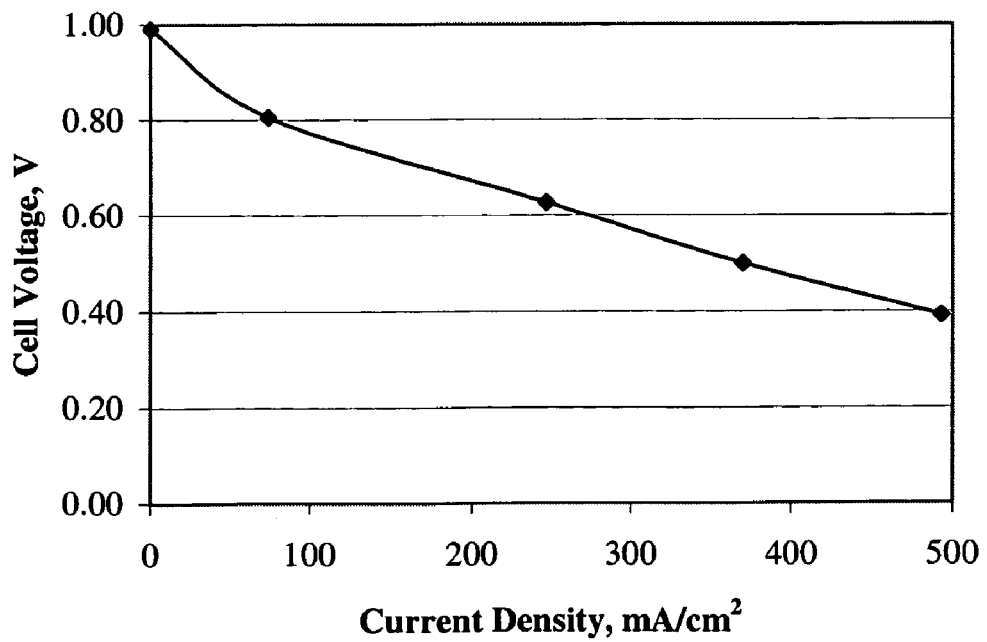

A single microfibrous fuel cell so formed was tested in a tube at room temperature. The fuel cell was about 6-inch-long and had a cathode surface area of about 2.92 cm². Air was passed through the bore of the cell, and $H_2$ was reacted on the shell of the cell. Both gases were at near ambient conditions. FIG. 16 shows the polarization curve of such microfibrous fuel cell.

EXAMPLE 7

This example illustrates the performance of a sub-bundle containing multiple microfibrous fuel cells containing fiber-supported outer electrocatalyst layers formed by using an alternative binding solution composition in fabricating the carbon ribbons.

The ratio of the removable carrier material $Y_2O_3$ to the binding material NAFION® ionomer in such alternative binding solution was about 40 wt %:60 wt %. 1-propyl alcohol was added to adjust the solid content ($Y_2O_3$ plus NAFION® ionomer ) to 2.5 wt %.

Eleven microfibrous fuel cells so formed were then bundled together to form the sub-bundle. All the other conditions and parameters were the same as those described in Example 1.

Figure 17:
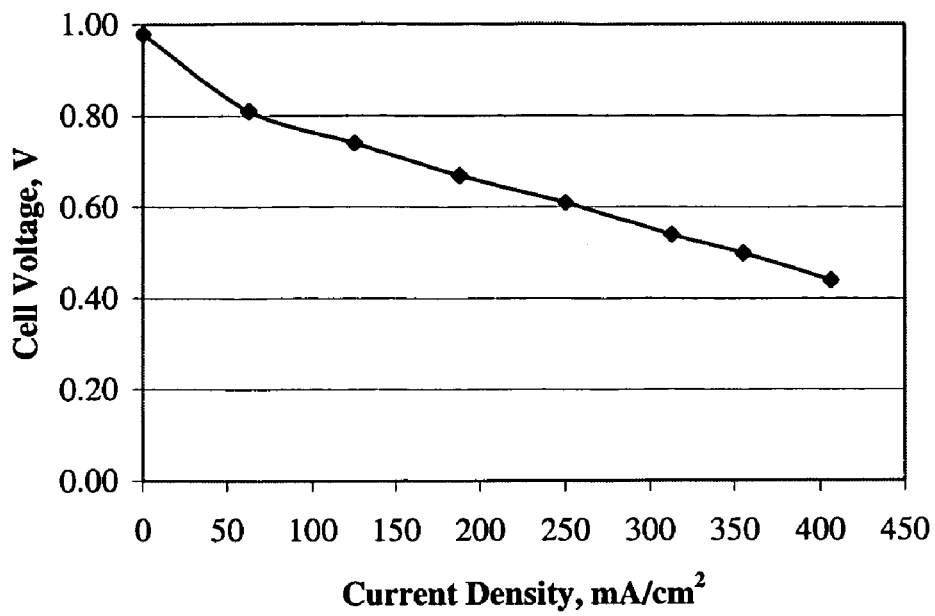

The sub-bundle was tested under similar conditions as those described in Example 3. The sub-bundle had an active cathode surface area of about 32 cm². The flow rate of $H_2$ was about 20 (mL/min)/A, and the flow rate for air was about 30 (mL/min)/A. FIG. 17 shows the polarization curve of the sub-bundle.

EXAMPLE 8

This example illustrates the performance of a sub-bundle made of multiple microfibrous fuel cells containing Cytec® carbon fibers (1000 filament, Cytec Engineering Materials, Anaheim, Calif.) as an alternate support for the outer electrocatalyst layers. The Cytec® carbon fiber designated as T-300 had the following properties:

TABLE 5

| | |
|---|---|
| Tensile Modulus (msi) | 33.5 |
| Tensile Strength (ksi) | 530 |
| Electrical Resistivity (μΩm) | 18 |
| Thermal Conductivity (W/m · K) | 8.5 |
| Filament Diameter (μ) | ~5-20 |
| Carbon Assay (%) | 7 |

The Cytec® carbon fibers were used to form the catalyzed carbon ribbons by coating a binding solution and a Pt catalyst ink solution onto the carbon fibers. Two carbon ribbons were then bonded onto the shell side of the MEA by using a 5 wt % NAFION® ionomer solution as the binding solution. The subsequently formed microfibrous fuel cells had a structure similar to those described in Examples 1 and 2.

Eleven such microfibrous fuel cells were then bundled together to form a sub-bundle. The sub-bundle was tested under similar conditions and parameters as those described in Example 2. The sub-bundle had an active cathode surface area of about 32 cm². The flow rate for $H_2$ is about 10 (mL/min)/A, and the flow rate for $O_2$ is about 30 (mL/min)/A.

Figure 18:
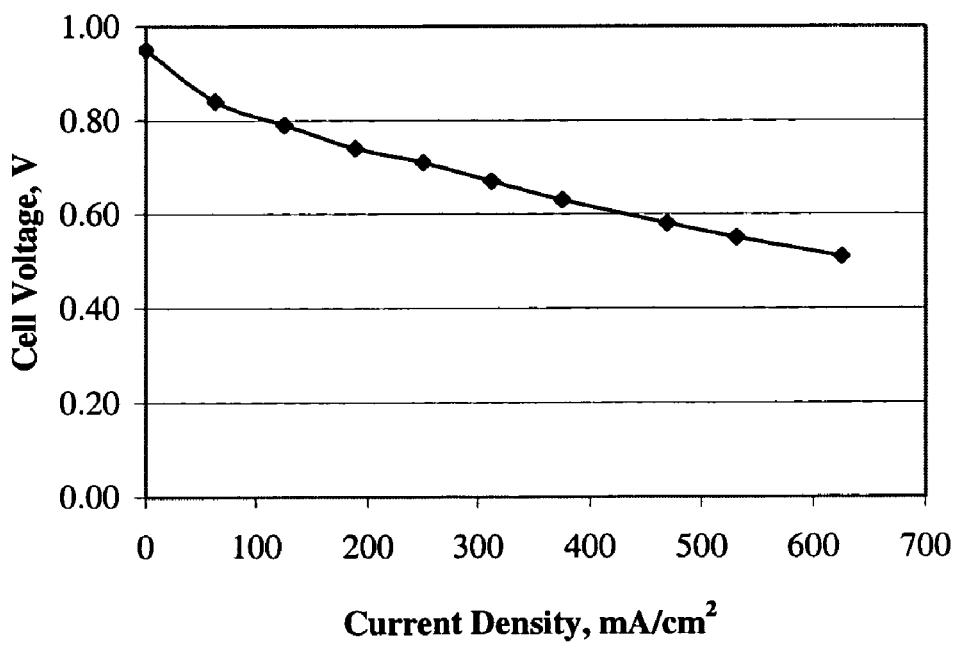

FIG. 18 shows the polarization curve of such sub-bundle at about 60° C.

While the invention has been described herein with reference to specific embodiments, features and aspects, it will be recognized that the invention is not thus limited, but rather extends in utility to other modifications, variations, applications, and embodiments, and accordingly all such other modifications, variations, applications, and embodiments are to be regarded as being within the spirit and scope of the invention.

What is claimed is:

1. A microfibrous fuel cell element, comprising:
    (a) a microfibrous hollow membrane separator defining a bore side and a shell side;
    (b) an inner current collector at the bore side thereof;
    (c) an inner electrocatalyst layer in contact with an inner surface of the membrane separator;
    (d) an outer current collector at the shell side thereof; and
    (e) an outer electrocatalyst layer in contact with an outer surface of the membrane separator,
    wherein said microfibrous fuel cell element has a longitudinal axis, wherein at least one of the inner and outer electrocatalyst layers comprises a fiber network comprising a multiplicity of unidirectional fibers impregnated with an electrocatalyst material so that the electrocatalyst material is fiber-reinforced, wherein essentially all of such unidirectional fibers of the fiber network are substantially parallel to the longitudinal axis of such microfibrous fuel cell element and the fiber network is substantially free of fibers that are not parallely oriented in relation to said longitudinal axis, wherein the fiber network comprises fibers that are embedded in and contact the electrocatalyst material over substantially all of their external surface, and wherein an inner fluid passage is provided between the inner electrocatalyst layer and the inner current collector for flow of either a fuel-containing or an oxidant-containing fluid.

2. The microfibrous fuel cell element of claim 1, wherein the multiple continuous conductive fibers comprise material selected from the group consisting of carbon, graphite, conductive polymers, metals, metal alloys, and composites or mixtures thereof.

3. The microfibrous fuel cell element of claim 1, wherein the multiple continuous conductive fibers comprise carbon fibers.

4. The microfibrous fuel cell element of claim 3, wherein the carbon fibers are characterized by a cross-sectional diameter in a range of from about 0.1 micron to about 100 microns.

5. The microfibrous fuel cell element of claim 3, wherein the carbon fibers are formed by carbonization of polyacrylonitrile fibers, pitch fibers, rayon fibers, cellulose fibers, phenolic fibers, epoxy fibers, phthalonitrile fibers, and fibers formed of aromatic acetylene-derived polymers.

6. The microfibrous fuel cell element of claim 1, wherein said multiple continuous conductive fibers are characterized by a tensile modulus in a range of from about 10 msi to about 140 msi.

7. The microfibrous fuel cell element of claim 1, wherein said multiple continuous conductive fibers are characterized by a tensile strength in a range of from about 200 ksi to about 900 ksi.

8. The microfibrous fuel cell element of claim 1, wherein said multiple continuous conductive fibers are characterized by an electrical resistivity in a range of from about 2 $\mu\Omega$m to about 30 $\mu\Omega$m.

9. The microfibrous fuel cell element of claim 1, wherein said multiple continuous conductive fibers are characterized by a thermal conductivity in a range of from about 5 W/m·K to about 700 W/m·K.

10. The microfibrous fuel cell element of claim 1, wherein the electrocatalyst layers comprise material selected from the group consisting of platinum, gold, ruthenium, iridium, palladium, rhodium, nickel, iron, molybdenum, tungsten, niobium, and alloys thereof.

11. The microfibrous fuel cell element of claim 1, wherein the electrocatalyst layers comprise platinum or platinum alloy selected from the group consisting of platinum-ruthenium alloy, platinum-ruthenium-iron alloy, platinum-molybdenum alloy, platinum-chromium alloy, platinum-tin alloy, and platinum-nickel alloy.

12. The microfibrous fuel cell element of claim 1, wherein the membrane separator comprises a solid electrolyte medium.

13. The microfibrous fuel cell element of claim 1, wherein the membrane separator comprises an ion-exchange ceramic material or an ion-exchange polymeric material.

14. The microfibrous fuel cell element of claim 1, wherein the membrane separator comprises an ion-exchange polymer selected from the group consisting of perflurocarbon-sulfonic-acid-based polymers, polysulfone-based polymers, perfluorocarboxylic-acid-based polymers, styrene-vinylbenzene-sulfonic-acid-based polymers, and styrene-butadiene-based polymers.

15. The microfibrous fuel cell element of claim 1, wherein the membrane separator comprises a perflurocarbon-sulfonic-acid-based polymer.

16. The microfibrous fuel cell element of claim 1, in a fuel cell assembly comprising multiple microfibrous fuel cell elements connected in series and/or parallel and disposed in a housing, wherein said housing provides a first fluid passage for flowing a fuel-containing fluid through either the bore or the shell sides of the microfibrous fuel cell elements, and a second fluid passage for flowing an oxygen-containing fluid through opposite sides of the microfibrous fuel cell elements.

17. The microfibrous fuel cell element of claim 16, wherein said first and second fluid passages are separated from and sealed against each other in a leak-tight manner.

18. A method for forming a microfibrous fuel cell element as claimed in claim 1, said method comprising the steps of:
    (i) providing one or more catalytic precursor structures, each of which comprises a fiber network impregnated with electrocatalyst material, wherein said fiber network comprises multiple continuous conductive fibers extending in substantially parallel directions; and
    (ii) incorporating said one or more catalytic precursor structures into at least one of the inner and outer electrocatalyst layers of a microfibrous fuel cell element, wherein the multiple continuous conductive fibers thereof are parallelly oriented in relation to longitudinal axis of the microfibrous fuel cell element.

19. The method of claim 18, wherein each of said one or more catalytic precursor structures is formed by the steps comprising:
    (1) forming a fiber network comprising multiple continuous conductive fibers extending in substantially parallel directions; and
    (2) impregnating such fiber network with an electrocatalyst material.

20. The method of claim 19, wherein the fiber network is formed by binding multiple continuous conductive fibers with a binding composition, and wherein said binding composition comprises (a) a binding material, (b) optionally, an electrically conductive material, and (c) optionally, a removable carrier material.

21. The method of claim 20, wherein said binding material comprises an ion-exchange polymer.

22. The method of claim 20, wherein said binding material comprises a perflurocarbon-sulfonic-acid-based polymer.

23. The method of claim 20, wherein said binding composition comprises a mixture of a perflurocarbon-sulfonic-acid-based polymer with carbon particles.

24. The method of claim 20, wherein said binding composition comprises polytetrafluoroethylene (PTFE).

25. The method of claim 20, wherein said binding composition comprises a removable carrier material.

26. The method of claim 25, wherein said removable carrier material comprises $Y_2O_3$.

27. The method of claim 20, wherein said binding composition further comprises one or more materials selected from the group consisting of polyethylene glycol (PEG), polyvinyl alcohol (PVA), polyvinyl pyrrolidone (PVP), and glycerol.

28. The method of claim 20, wherein said binding composition further comprises at least one hydrophobicity-imparting material.

29. The method of claim 28, wherein said hydrophobicity-imparting material is selected from the group consisting of polytetrafluoroethylene (PTFE), tetrafluoroethylene (TFE), hydrophobic fluoropolymers, and hydrophobic fused silica.

30. The method of claim 18, wherein said one or more catalytic precursor structures are characterized by a ribbon conformation.

31. The method of claim 30, wherein said one or more ribbon-shaped catalytic precursor structures are characterized by a thickness in a range of from about 5 microns to about 100 microns.

32. The method of claim 30, wherein each of said ribbon-shaped catalytic precursor structures comprises multiple layers of continuous conductive fibers.

33. The method of claim 30, wherein said one or more ribbon-shaped catalytic precursor structures are incorporated into the microfibrous fuel cell element by attaching said one or more ribbon-shaped catalytic precursor structures to a fibrous substrate that comprises either a microfibrous inner current collector or a microfibrous membrane separator.

34. The method of claim 33, wherein an adhesion composition is applied to a surface of said fibrous substrate for enhancing adhesion between said one or more ribbon-shaped catalytic precursor structures and said fibrous substrate.

35. The method of claim 34, wherein the fibrous substrate comprises a microfibrous inner current collector, and wherein said adhesion composition comprises an adhesion material selected from the group consisting of polyvinyl pyrrolidone (PVP), polyvinyl alcohol (PVA), polyethylene glycol (PEG), and glycerol.

36. The method of claim 34, wherein the fibrous substrate comprises a microfibrous membrane separator, and wherein said adhesion layer comprises an ion-exchange polymer.

37. The method of claim 36, wherein said ion-exchange polymer comprises a perflurocarbon-sulfonic-acid-based polymer.

38. The method of claim 33, wherein said one or more ribbon-shaped catalytic precursor structures are attached to said fibrous substrate by concurrently passing said one or more ribbon-shaped catalytic precursor structures and said fibrous substrate through an applicator die, and wherein said applicator die is sized to force conformation of said one or more ribbon-shaped catalytic precursor structures to the contour of said fibrous substrate.

39. A method for forming a microfibrous fuel cell element as claimed in claim 1, said method comprising the steps of:
(a) providing multiple continuous conductive fibers arranged substantially parallel to one another, or a fiber network that comprises multiple continuous conductive fibers substantially parallel to one another;
(b) providing a catalyst composition comprising an electrocatalyst material and optionally a binder material; and
(c) incorporating said conductive fibers or fiber network and said catalyst composition into at least one of the inner or outer electrocatalyst layers of a microfibrous fuel cell element, to form a fiber network that is impregnated with electrocatalyst material and comprises multiple continuous conductive fibers parallelly oriented in relation to longitudinal axis of the microfibrous fuel cell element.

40. A method for forming a microfibrous fuel cell element as claimed in claim 1, comprising the steps of:
(a) providing a microfibrous inner current collector;
(b) passing said microfibrous inner current collector through a first extrusion die for applying a layer of a first adhesion composition thereover, wherein said first adhesion composition comprises a first adhesion material and optionally an electrocatalyst material;
(c) attaching multiple continuous conductive fibers, one or more fiber networks, or one or more catalyst structures to the microfibrous inner current collector, to form a first microfibrous structure that comprises the inner current collector and an inner electrocatalyst layer, wherein said inner electrocatalyst layer comprises a fiber network that is impregnated with an electrocatalyst material and comprises multiple conductive fibers that are substantially parallel to one another;
(d) passing said first microfibrous structure through a second extrusion die for applying a membrane-forming material layer over the inner electrocatalyst layer;
(e) heating and/or drying said membrane-forming material layer to form a second microfibrous structure that comprises the inner current collector, the inner electrocatalyst layer, and a solidified membrane separator;
(f) passing said second microfibrous structure through a third extrusion die for applying a layer of a second adhesion composition thereover, wherein said second adhesion composition comprises a second adhesion material and optionally an electrocatalyst material;
(g) attaching multiple continuous conductive fibers, one or more fiber networks, or one or more catalyst structures to the second microfibrous structure, to form a third microfibrous structure that comprises the inner current collector, the inner electrocatalyst layer, the membrane separator layer, and an outer electrocatalyst layer, wherein said outer electrocatalyst layer comprises a fiber network that is impregnated with an electrocatalyst material and comprises multiple conductive fibers that are substantially parallel to one another;
(h) treating said third microfibrous structure, so as to provide a fluid passage between the inner current collector and the inner electrocatalyst layer; and
(i) attaching an outer current collector to an outer surface of said third microfibrous structure to form a microfibrous fuel cell element,
wherein said microfibrous fuel cell element has a longitudinal axis, wherein the conductive fibers of the fiber network in step (c) and/or (g) are arranged along directions that are substantially parallel to the longitudinal axis of such microfibrous fuel cell element.

41. The method of claim 40, wherein said microfibrous inner current collector provided in step (a) contains a coating of a removable substrate material, which is subsequently removed in step (h) to provide the fluid passage between the inner current collector and the inner electrocatalyst layer.

42. The method of claim 41, wherein said removable substrate material comprises water-soluble polymeric material selected from the group consisting of polyvinyl pyrrolidones (PVP), polyvinyl alcohols (PVA), and polyethylene glycols (PEG).

43. The method of claim 40, wherein said membrane-forming material used in step (d) comprises a swellable polymeric membrane-forming material, which forms a swellable membrane separator, and wherein said swellable membrane separator is subsequently contacted with a swelling agent in step (h) to provide the fluid passage between the inner current collector and the inner electrocatalyst layer.

44. The method of claim 43, wherein said swellable polymeric membrane-forming material comprises a perfluorocarbon-sulfonic-acid-based polymer.

45. The method of claim 40, wherein said first adhesion material in step (b) comprises material selected from the group consisting of polyvinyl pyrrolidone (PVP), polyvinyl alcohol (PVA), polyethylene glycol (PEG), and glycerol.

46. The method of claim 40, wherein said second adhesion material in step (f) comprises a perflurocarbon-sulfonic-acid-based polymer.

47. The method of claim 40, wherein said microfibrous fuel cell is formed in a continuous manner.

* * * * *